US006763388B1

(12) United States Patent
Tsimelzon

(10) Patent No.: US 6,763,388 B1
(45) Date of Patent: Jul. 13, 2004

(54) METHOD AND APPARATUS FOR SELECTING AND VIEWING PORTIONS OF WEB PAGES

(75) Inventor: Mark Tsimelzon, Sunnyvale, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 09/371,161

(22) Filed: Aug. 10, 1999

(51) Int. Cl.[7] .......................... G06F 15/16; G06F 17/00
(52) U.S. Cl. ...................... 709/228; 709/218; 715/501.1
(58) Field of Search ................................ 709/227, 228, 709/218, 219, 230; 715/500.1, 501.1, 513; 345/733, 749, 738, 744, 745, 760

(56) References Cited

U.S. PATENT DOCUMENTS

| | | | | | |
|---|---|---|---|---|---|
| 5,638,504 | A | * | 6/1997 | Scott et al. ................ 707/530 |
| 5,649,186 | A | * | 7/1997 | Ferguson ..................... 707/10 |
| 5,734,831 | A | * | 3/1998 | Sanders ...................... 709/223 |
| 5,740,430 | A | * | 4/1998 | Rosenberg et al. ......... 707/200 |
| 5,754,938 | A | * | 5/1998 | Herz et al. .................. 725/116 |
| 5,764,662 | A | * | 6/1998 | Pinto ............................ 372/20 |
| 5,774,670 | A | * | 6/1998 | Montulli ...................... 709/227 |
| 5,790,790 | A | * | 8/1998 | Smith et al. ................. 709/206 |
| 5,793,497 | A | * | 8/1998 | Funk ........................... 358/402 |
| 5,813,007 | A | * | 9/1998 | Nielsen ........................ 707/10 |
| 5,848,427 | A | * | 12/1998 | Hyodo ......................... 707/513 |
| 5,901,287 | A | * | 5/1999 | Bull et al. ................... 709/218 |
| 5,983,227 | A | | 11/1999 | Nazem et al. |
| 5,987,480 | A | * | 11/1999 | Donohue et al. ......... 707/501.1 |
| 6,012,071 | A | * | 1/2000 | Krishna et al. ............. 707/522 |
| 6,029,182 | A | * | 2/2000 | Nehab et al. ................ 707/523 |
| 6,091,411 | A | * | 7/2000 | Straub et al. ................ 345/747 |
| 6,104,401 | A | * | 8/2000 | Parsons ....................... 345/804 |
| 6,108,703 | A | * | 8/2000 | Leighton et al. ............ 709/226 |
| 6,128,663 | A | * | 10/2000 | Thomas ....................... 709/228 |
| 6,199,077 | B1 | * | 3/2001 | Inala et al. ............... 707/501.1 |
| 6,219,818 | B1 | * | 4/2001 | Freivald et al. ............. 714/799 |
| 6,356,283 | B1 | * | 3/2002 | Guedalia ..................... 345/760 |
| 6,523,063 | B1 | * | 2/2003 | Miller et al. ................ 709/206 |
| 6,539,420 | B1 | * | 3/2003 | Fields et al. ................ 709/206 |
| 6,643,684 | B1 | * | 11/2003 | Malkin et al. .............. 709/206 |
| 2003/0135509 | A1 | * | 7/2003 | Davis et al. ................ 707/100 |
| 2003/0154239 | A1 | * | 8/2003 | Davis et al. ................ 709/201 |

FOREIGN PATENT DOCUMENTS

| WO | WO 200111488 A2 | * | 2/2001 | ........... G06F/17/00 |
|---|---|---|---|---|
| WO | WO 200111502 A2 | * | 2/2001 | ........... G06F/17/30 |
| WO | WO 200111503 A2 | * | 2/2001 | ........... G06F/17/30 |

OTHER PUBLICATIONS

WAP/WAE, "Wireless Application Protocol/Wireless application Environment Overview", WAP Forum, LTD., www.wapforum.org, pp. 1–26, 1998.*

(List continued on next page.)

Primary Examiner—Jason D. Cardone
(74) Attorney, Agent, or Firm—Locke Liddell & Sapp LLP

(57) ABSTRACT

A method for creating a short web page based on an original web page includes retrieving a current version of the original web page. The current version of the web page is divided into a plurality of blocks. User-selection information is added to each of the plurality of blocks, the user-selection information including a select and a non-select user option. The user selects ones of the plurality of blocks by exercising a select user option from the user-selection information associated with each of the plurality of blocks. The user non-selects others of the plurality of blocks by exercising a non-select user option from the user-selection information associated with each of the plurality of blocks. Only the user selected ones of the plurality of blocks are stored. A short web page is created based only on the stored ones of the plurality of blocks.

13 Claims, 24 Drawing Sheets

OTHER PUBLICATIONS

WAP Forum, "Wireless Application Protocol: White Paper", Wireless Internet Today, www.wapforum.org, Jun. 2000.*

Buyukkokten, O. et al., "Accordion summarization for end-game browsing on PDAs and cellular phones", ACM SIGCHI conference, pp. 213–220, Apr. 2001.*

Manber, U., "Creating a personal Web notebook", Proceedings of the USENIX Symposium on Interent Technologies and Systems, pp. 183–191, Dec. 1997.*

Sugiura, A. et al., "Internet scrapbook: automating Web browsing tasks by demonstration", ACM Symposium on User Interface Software and Technology, pp. 9–18, Nov. 1998.*

Yamada, s. et al., "Monitoring partial updates in Web pages using relational learning", Adaptive Hypermedia and Adpative Web–bases Systems, AH 2002, lecture notes in Computer Science vol. 2347, pp. 452–455, May 2002.*

Document entitled "Company: Technology," Copyright ©1999 NetMind, http://www.netmind.com/html/technology.html, two–page document.

Document entitled "Individual: Track Changes On The Web," Copyright ©1999 NetMind, http://www.netmind.com/html/individual.html, two–page document.

Document entitled "Individual: A Cool New Feature," Copyright ©1999 NetMind, http://www.netmind.com/html/persistent_search.html, two–page document.

Document entitled "Individual: What You Can Track," Tracking Features, Copyright ©1999 NetMind, http://www.netmind.com/html/tracking_features.html, three–page document.

Document entitled "Individual: How You're Notified," Notification Options, Copyright ©1999 NetMind, http://www.netmind.com/html/notification_options.html, two–page document.

Document entitled "Individual: View & Edit What You Track," Minder Central, Copyright ©1999 NetMind, http://www.netmind.com/html/minder_central.html, two–page document.

Document entitled "Online Anywhere, Author Once, View Anywhere, Products," date unknown, http: www.onlineanywhere.com/products.htm, three–page document.

Document entitled "AvantGo Connect v.2.0," Copyright ©1998, 1999, three–page document.

Marty Kacin, "Avantgo: Web Pages To Handhelds, Tips for Optimizing Web Pages for Handheld Devices," PalmPower Magazine Article, date unknown, six–page document.

Document entitled "AvantGo Client v2.0," Copyright ©1998, two–page document.

Document entitled "NetMind, Products Overview," Copyright ©1998 NetMind, http://www.netmind.com/html/products.html, three–page document.

Draft document entitled "Enterprise Information Portals, Realizing The Vision of 'Information at Your Fingertips,'" A Viador Inc. White Paper, Jan. 1999, Copyright ©1999, 17–page document.

Document entitled "Welcome to Mind–it," Version 3.0 Beta 2, Mind–it by NetMind, http://mindit.netmind.com/, one-page document.

Document entitled "Viador E–Portal Suite™ The Information Portal for E–Business," Viador Product Showcase, http://www.viador.com/products/products.html, five–page document.

Document entitled "ProxiNet: Technology," Copyright ©1999, ProxiNet, Inc., http://www.proxinet.com/technology/, three–page document.

Armando Fox, "Information Delivery Infrastructure in the Mobile, Wireless Age," White Paper, Copyright ©1999 Proxinet, Inc., pp 1–6.

Document entitled "ProxiNet: Products & Services," Copyright ©1999 ProxiNet, Inc., http://www.proxinet.com/products_n_serv/, three–page document.

Document entitled "AdvantGo," Copyright ©2000 AvantGo, Inc., http://avantgo.com/frontdoor/index.html, one–page document.

Document entitled "Welcome to My Yahoo!," Copyright ©2000 Yahoo! Inc., http://www.my.yahoo.com/, three–page document.

Document entitled "Excite Mobile," Copyright ©2000 At Home Corporation, http://www.excite.com/, two–page document.

Document entitled "Yahoo Acquires Online Anywhere Enables users to Get their Yahoo! Anywhere, Anytime," Jun. 2, 1999, Santa Clara, CA, http://docs.yahoo.com/docs/pr/release322.html, two–page document.

Advertisement entitled "Online Anywhere Solution Deployed by On Command For TV Internet Market Trial In Hotels," Apr. 13, 1999, Palo Alto, CA http://www.hospitalitynet.org/lodging/news/4001474.htm, three–page document.

* cited by examiner

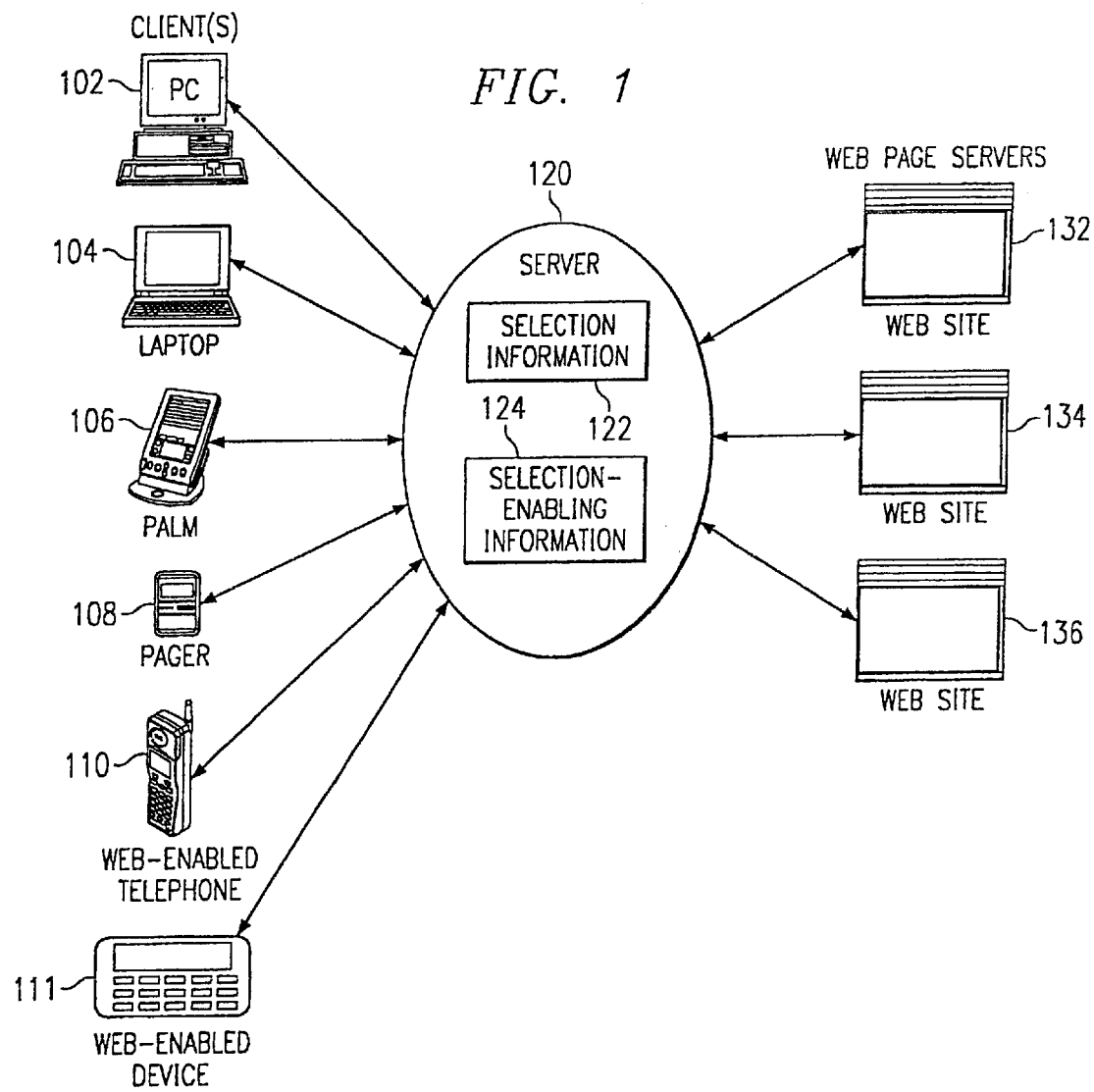

FIG. 3(b)

```html
<html>
<head>
<title>START Page</title>
</head>
<script Language="JavaScript"> function ButtonClicked (buttonName)
{
if (document.main_form.txtURL.value == ' ')
{
alert ( ' Please enter a URL. ' ) ;
return false;
}
else
{
document.main_form.btnAction.value = buttonName;
return true;
}
}
</script>

<body>
<font size="-1" color="#2244ff">

<p><font size="-1"><A href="http://shortpage.com:9999/UserName=1ma
jerus&ProcName=NotifPage" target="_top"><font color="#2244ff">Noti
fications Page</font></A> - <A href="http://shortpage.com:9999/Use
rName=1majerus&ProcName=START_F" target="_top"><font color="2244f
f">Edit Profile</font></A - <A href="http://shortpage.com:9999/Us
erName=1majerus&ProcName=Help&Index=3&Browser=1" target="_top"><fo
nt color="#2244ff">Help</font></A></font>
<!-- END OF NAVIGATION BAR -->

</font> </p>

<h2 align="center">1majerus's START page</h2>
<font size="-1" color="#0000FF">

<p></font></p>

<form action="http://shortpage.com:9999/UserName=1majerus&ProcName
=WizardAction&Place=Start" method="POST" name="main_form"
onSubmit="if(txtURL.value == ' ' ) {          alert ( ' Please enter a URL.
```

FIG. 3(c)

```
' ) ;      return false; }else if (btnAction.value == 'invalid' ) {       bt
nAction.value = 'Browse' ;      return true; } ">
  <input type="hidden" name="btnAction" value="invalid"><p>Address
  <input type="text"
    size="60" name="txtURL" value>  <input type="submit" name="
btn1" value="Browse"
    onClick="return ButtonClicked ( ' Browse ' ) ; "></p>
  <p><input type="submit" name="btn" value="Create Shortpage"
    onClick="return ButtonClicked ( ' Create Shortpage ' ) ;"> <input type
="submit" name="btn"
    value="Create Notification" onClick="return ButtonClicked ( ' Creat
e Notification ' ) ;">
              &nbs
p; <input
    type="submit" name="btn" value="Create ComboPage"
    onClick="btnAction.value = "Create ComboPage";; submit(
) ; return false;"> </p>
  <hr>
</form>
<script Language="JavaScript">
function DoAction (type, id)
{
  if (document.second_form.btnAction [document.second_form.btnAction.
selectedIndex] .value == 'Delete')
  {
    doDelete = confirm ( ' Delete this ' + type + '?' ) ;
    if (doDelete)
    {
      document.second_form.txtID.value = id;
      document.second_form.submit ( ) ;
    }
  }
  else
  {
    document.second_form.txtID.value = id;
    document.second_form.submit ( ) ;
  }
  return false;
}
</script>
<form action="http://shortpage.com:9999/UserName=1majerus&ProcName
```

FIG. 3(d)

```
.=WizardAction&Place=Start" method="GET" name="second_form">
    <input type="hidden" name="txtID" value><table width="100%">
    <tr valign="top">
        <td width="16%"><h3>Action</h3>
        <p><select name="btnAction" size="4">
            <option value="Go" selected>Go</option>
            <option value="Edit">Edit</option>
            <option value="Options">Options</option>
            <option value="Delete">Delete</option>
        </select><!-- This is not a button but using the same name m
akes things very convenient --><br>
        </p>
        <p>New Folder:<br>
        <input type="text" name="NewFolderName" size="9"> <br>
        <input type="submit" value="Create!" name="btnNewfolder"></p>
        <p> </td>
        <td width="84%"><table width=100%><tr valign=top>
<td width=33%><a href=http://shortpage.com:9999/UserName=1majerus&
ProcName=FolderOp&OpCode=Collapse&FolderID=116761&LoopBack=http%3A
%2F%2Fshortpage.com%3A9999%2FUserName%3D1majerus%26ProcName%3DStar
tPage><img src=http://www.shortware.com/images/minus_button. gif bo
rder=0></a><big><font color="#009900">ShortPages</font></big><BR>
<A href="http://shortpage.com:9999/UserName=1majerus&ProcName=P_Ge
tPagelet&ID=89115" onClick='return DoAction("ShortPage", 89115) ;'>
<font color="#2244ff">www.uspto.gov</font></A><BR>
<A href="http://shortpage.com:9999/UserName=1majerus&ProcName=P_Ge
tPagelet&ID=89117" onClick='return DoAction("ShortPage", 89117) ;'>
<font color="#2244ff">www.uspto.gov/cgi-bin/phone/ptophone</font><
/A><BR>
<A href="http://shortpage.com:9999/UserName=1majerus&ProcName=P_Ge
tPagelet&ID=89126" onClick='return DoAction("ShortPage", 89126) ;'>
<font color="#2244ff">164.195.100.11/netahtml/search-bool.html</fo
nt></A><BR>
<A href="http://shortpage.com:9999/UserName=1majerus&ProcName=P_Ge
tPagelet&ID=89128" onClick='return DoAction("ShortPage", 89128) ;'>
<font color="#2244ff">www.uspto.gov</font></A><BR>
<A href="http://shortpage.com:9999/UserName=1majerus&ProcName=P_Ge
tPagelet&ID=89129" onClick='return DoAction("ShortPage", 89129) ;'>
<font color="#2244ff">www.uspto.gov</font></A><BR>
<A href="http://shortpage.com:9999/UserName=1majerus&ProcName=P_Ge
tPagelet&ID=89130" onClick='return DoAction ("ShortPage", 89130) ;'>
<font color="#2244ff">www.uspto.gov</font></A><BR>
```

FIG. 3(e)

```
<A href="http://shortpage.com:9999/UserName=1majerus&ProcName=P_Ge
tPagelet&ID=89133" onClick='return DoAction ("Short Page", 89133);'>
<font color="#2244ff">www.optipat.com</font></A><BR>
<A href="http://shortpage.com:9999/UserName=1majerus&ProcName=P_Ge
tPagelet&ID=111525" onClick='return DoAction("ShortPage", 111525) ;
'><font color="#2244ff">www.uspto.gov</font></A><BR>
<BR>
<a href=http://shortpage.com:9999/UserName=1majerus&ProcName=Folde
rOp&OpCode=Expand&FolderID=116765&LoopBack=http%3A%2F%2Fshortpage.
com%3A9999%2FUserName%3D1majerus%26ProcName%3DStartPage><img src=h
ttp://www.shortware.com/images/add_button.gif border=0></a><big><f
ont color="#009900">test</font></big><BR>
<BR>
</td>
<td width=33%><a href=http://shortpage.com:9999/UserName=1majerus&
ProcName=FolderOp&OpCode=Collapse&FolderID=116762&LoopBack=http%3A
%2F%2Fshortpage.com%3A9999%2FUserName%3D1majerus%26ProcName%3DStar
tPage><img src=http://www.shortware.com/images/minus_button.gif bo
rder=0></a><big><font color="#009900">ComboPages</font></big><BR>
<A href="http://shortpage.com:9999/UserName=1majerus&ProcName=P_Ge
tPagelet&ID=89118" onClick='return DoAction("ComboPage", 89118) ;'>
<font color="#2244ff">ComboPage #1</font></A><BR>
<A href="http://shortpage.com:9999/UserName=1majerus&ProcName=P_Ge
tPagelet&ID=103560" onClick='return DoAction("ComboPage", 103560) ;
'><font color="#2244ff"></font></A><BR>
<BR>
</td>
<td width=33%><a href=http://shortpage.com:9999/UserName=1majerus&
ProcName=FolderOp&OpCode=Collapse&FolderID=116763&LoopBack=http%3A
%2F%2Fshortpage.com%3A9999%2FUserName%3D1majerus&ProcName%3DStar
tPage><img src=http://www.shortware.com/images/minus_button.gif bo
rder=0></a><big><font color="#009900">Notifications</font></big><B
R>
<A href="http://shortpage.com:9999/UserName=1majerus&ProcName=P_Ge
tPagelet&ID=89111" onClick='return DoAction("Notification", 89111)
;'><font color="#2244ff">www.uspto.gov</font></A><BR>
<BR>
</td>
</tr></table>
</td>
    </tr>
  </table>
</form>
</body>
</html>
```

METHOD AND APPARATUS FOR SELECTING AND VIEWING PORTIONS OF WEB PAGES

RELATED APPLICATIONS

1) U.S. application Ser. No. 09/372,410 of M. Tsimelzon entitled "Method and Apparatus for Combining Parts of Different Web Pages," filed concurrently herewith.

2) U.S. application Ser. No. 09/372,402 of M. Tsimelzon entitled "Method and Apparatus for Notifying a User of Changes to Certain Parts of Web Pages," filed concurrently herewith.

This application includes subject matter protected by copyright.

BACKGROUND OF THE INVENTION

The present invention relates generally to computer networks and, specifically, to a method and apparatus that allow users to select certain portions of web pages to form "short-" web pages.

The expanded popularity of the World Wide Web ("the web") has brought new problems for web users. As users obtain more and more information from the web, they must visit greater numbers of different web pages to obtain the information. This information is often contained on several separate web pages or web sites. Alternately, a user may wish to see only a small piece of information that is contained in a very large and complex page or site. The user must search through the pages in which he is not interested to reach the information that he wishes to see.

Many users visit the same sequence of web pages or sites on a daily or a regular basis. For example, some users might check the weather or their stock portfolio on a daily basis. Even though a user may visit the same web pages and/or sites regularly, the user must still take individual actions to visit each of his regularly visited web pages or sites. For example, the user may have to enter the web addresses of each page or click on each page in a list of saved addresses in his browser. This repeated entry of web addresses is time consuming and involves un-needed repetitive action by the user.

What is needed is a way to avoid regularly re-entering the same multiplicity of web addresses and a way to avoid having to navigate through multi-level web sites to reach desired information.

SUMMARY OF THE INVENTION

A described embodiment of the present invention allows users to select certain sub-elements of web pages for later viewing. The user can use any of a wide variety of client devices to view the web page, such as a computer, a handheld device, or a cell phone. When the user views the shortened web page at a later time, only the sub-elements of the web page selected by the user are displayed. Thus, the user views only preselected sub-elements of the web page.

Multiple users can share a short page. Such a shared shortpage is called a shared portal. For example, multiple users can place information on a short page. Alternately, multiple users can view a shortpage created by a third party or third parties.

In accordance with the purpose of the invention, as embodied and broadly described herein, the invention is a method for creating a short web page, comprising: allowing a user to choose a subset of elements that appear on an original web page; saving the user's choices; and creating a short web page that is based on the original web page, and includes the elements chosen by the user in accordance with the user's saved choices.

In further accordance with the purpose of the invention, as embodied and broadly described herein, the invention is a method for creating a short web page, comprising: storing in a memory selection information specifying the elements on a short web page, the short web page being based on an original web page; retrieving the original web page upon which the short web page is based; and creating the short web page from elements on the original web page in accordance with the selection information.

In further accordance with the purpose of the invention, as embodied and broadly described herein, the invention is a computer-implemented method performed by a server data processing system, comprising: receiving, from a client, a request for a web page; retrieving the requested web page; sending the requested web page to the client; receiving, from the client, selection information for the requested web page, the selection information indicating a subset of the information of the web page that is smaller than the set of all information on the web page; and storing the selection information in the server data processing system.

In further accordance with the purpose of the invention, as embodied and broadly described herein, the invention is a computer-implemented method performed by a server data processing system, comprising: receiving, from a client, a request for a user's short page; retrieving a web page on which the user's short page is based; selecting sub-elements of the retrieved web page, in accordance with selection information of the user stored in the server data processing; and sending the user's short page, containing the selected sub-elements of the retrieved web page to the user.

In further accordance with the purpose of the invention, as embodied and broadly described herein, the invention is a computer-implemented method performed by a client data processing system, comprising: sending, by a client, a request for a web page; receiving the requested web page; allowing the user to select sub-elements of the received web page as being hidden or shown, the hidden sub-elements being indicated by selection information; and sending, to a server, the selection information for the web page.

In further accordance with the purpose of the invention, as embodied and broadly described herein, the invention is an apparatus to create a short web page, comprising: a software portion configured to allow a user to choose a subset of elements that appear on an original web page; a software portion configured to save the user's choices; and a software portion configured to create a short web page that is based on the original web page, and that includes the elements chosen by the user in accordance with the user's saved choices.

In further accordance with the purpose of the invention, as embodied and broadly described herein, the invention is an apparatus for creating a short web page, comprising: a software portion configured to store in a memory selection information specifying the elements on a short web page, the short web page being based on an original web page; a software portion configured to retrieve the original web page upon which the short web page is based; and a software portion configured to create the short web page from elements on the original web page in accordance with the selection information.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 1 is a block diagram of data processing elements in accordance with a preferred embodiment of the present invention.

FIGS. 3(b)–3(e) show the HTML source for a startpage.

DETAILED DESCRIPTION OF EMBODIMENTS

Figure 2A:
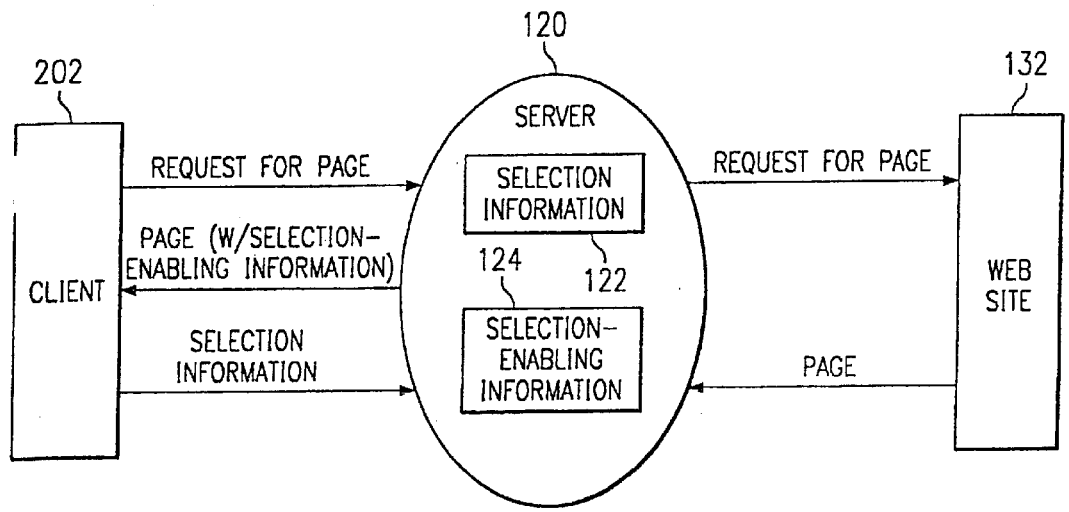
FIGS. 2(a) and 2(b) are block diagrams showing an information flow in a preferred embodiment of the present invention.

Reference will now be made in detail to several embodiments of the present invention, examples of which are illustrated in the accompanying drawings. Wherever practicable, the same reference numbers will be used throughout the drawings to refer to the same or like parts.

I. General Discussion

A described embodiment of the present invention allows users to select certain sub-elements of one or more web pages as a shortpage. The user selects certain sub-elements of an original web page to create a shortpage. The user's selection information is saved and, when the user views the shortpage at a later time, only the sub-elements of the web page indicated by the user are displayed for viewing by the user. Thus, the user views only preselected sub-elements of the web page. This section discusses an exemplary data processing system used to implement a preferred embodiment of the present invention.

FIG. 1 is a block diagram of data processing elements in accordance with a preferred embodiment of the present invention. FIG. 1 includes a server data processing system 120 communicating with one or more client data processing systems. These client data processing systems include, but are not limited to, a desktop personal computer (PC) 102, a laptop computer 104, a palm computer (personal computer/assistant or handheld device) 106, a pager 108 (such as an alphanumeric pager), a web-enabled telephone or a cell phone 110, or some other appropriate web-enabled device or appliance 111. A web-enabled telephone or device could use, for example, the WAP (Wireless Application Protocol) or any other appropriate protocol. It should be understood that the client data processing systems shown in FIG. 1 are shown for purposes of example only and are not to be construed in a limiting sense. Any other appropriate type of client can be used in conjunction with the present invention. FIG. 1 also includes a plurality of web page servers 132, 134, 136. Each web page server communicates with server 120 and stores one or more web sites or web pages. Server 120 stores selection information 122 for each user and further stores selection-enabling information 124 that is added to a web page to enable a user to make selections from a web page. Communication can be over a network, such as the internet, an intranet, a wireless network, or in any other appropriate manner.

FIG. 2(a) shows an overview of creation of a shortpage. As shown in FIG. 2(a), during operation, a client 202 sends a request to server 120 for a web page. Server 120 retrieves the web page from an appropriate one of web sites 132–136. The server 120 adds selection-enabling information to the retrieved web page and sends the web page to the client. The client selects sub-elements of the web page and sends that selection information to server 120. Server 120 stores selection information 122 describing the shortpages defined by a user.

Figure 2B:
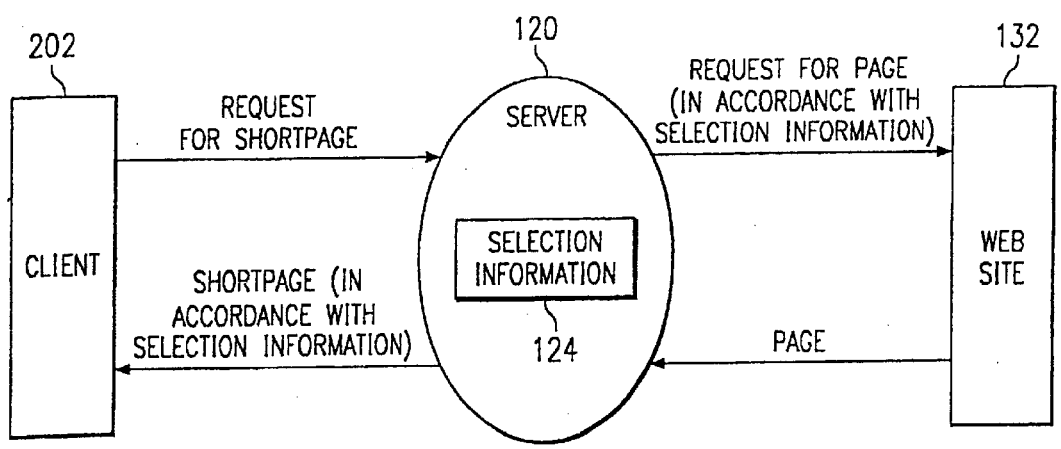

FIG. 2(b) shows an overview of viewing a shortpage. The client sends a request for a shortpage to server 120. Server 120 determines the page or pages needed to view the shortpage in accordance with the stored selection information and retrieves the page or pages from the web site 132. Server 120 shortens the retrieved web page in accordance with the selection information to form a shortpage and sends the shortpage to the client.

It should be understood that each of the clients, servers, and web servers in the described embodiment preferably includes a processor and a memory. The memory includes instructions capable of being executed by the processor to perform the functions described below. A client and/or a server can also include a computer readable medium for storing the instructions. Server 120 communicates with the clients and the web page servers via any appropriate communication mechanism, including but not limited to a network, an intranet, the internet, wireless communications, telecommunications, cable modems, and satellite communications.

A client may include browser software suitable for viewing web pages. The browser software can be standalone or integrated within other software products. The functionality can be stored, for example, as a link, a JavaScript, or as a Java applet. Handheld clients contain a specialized browser that receive "snipped" sub-elements of web pages for viewing on a handheld client. Other clients (such as cell phones) do not necessarily contain a browser. It should be understood that references herein to "HTML" can be understood to refer to any appropriate page specification language, such as a hypertext language or a proprietary language.

The following paragraphs describe an example of how a user makes a shortpage. This example is provided for exemplary purposes only and is not to be interpreted in a limiting sense.

Figure 3A:
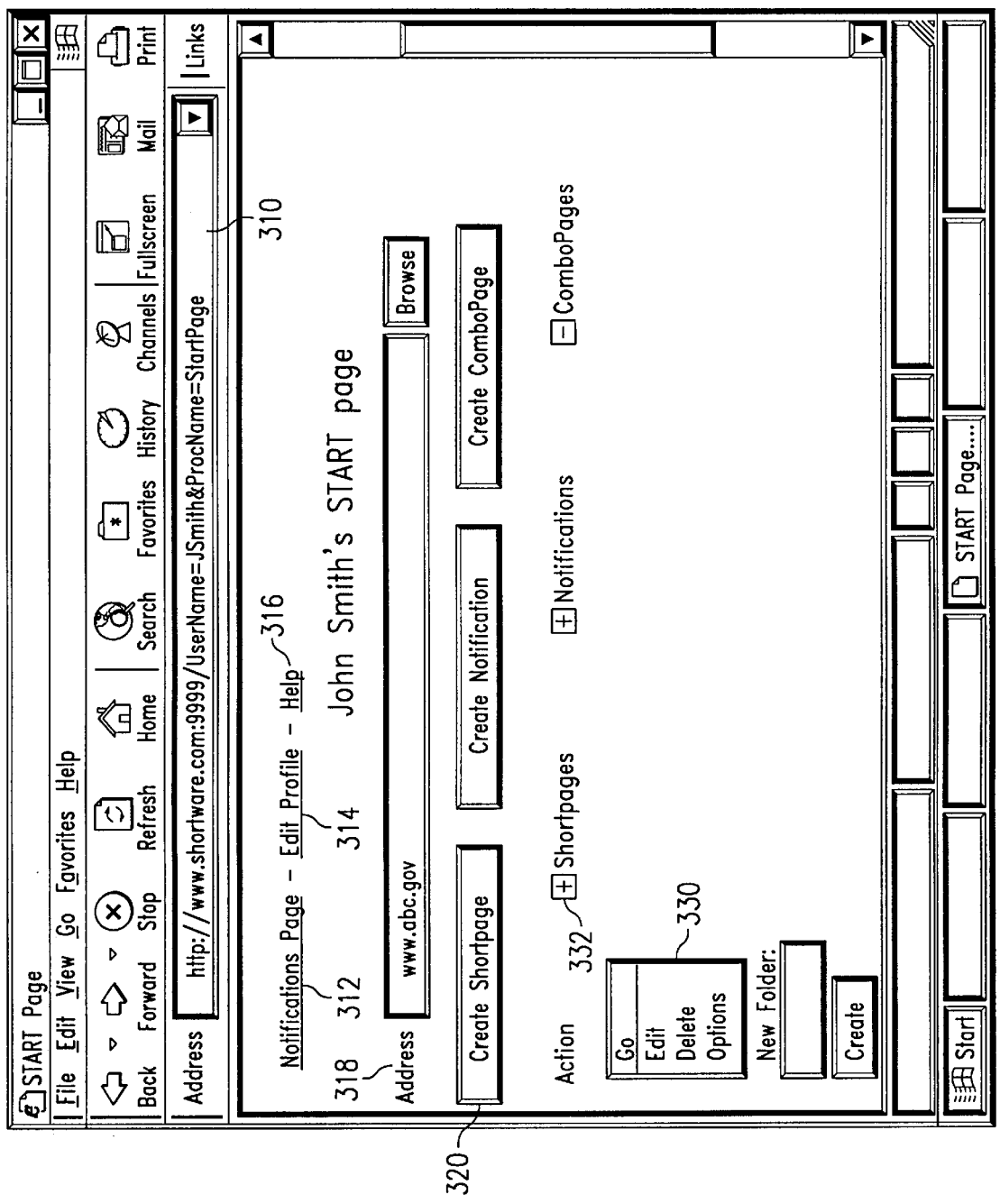
FIG. 3(a) shows a display of a startpage that allows a user to create and edit shortpages.

FIG. 3(a) shows a display of a "startpage" on a browser in a client. The startpage allows a user to create and edit shortpages and displays existing shortpages. Each user has his own startpage. The information needed to make a startpage is preferably stored in server 120. FIG. 3(a) shows a URL 310 of the exemplary startpage for user John Smith (http://www.shortware.com:9999/UserName=Jsmith&ProcName=StartPage).

The startpage of FIG. 3(a) includes a link to a Notifications page 312, a link to an Edit profile page 314, and a link to a Help page 316. The startpage of FIG. 3(a) allows a user to create, edit, delete, and view shortpages and their options. To create a shortpage, in the described embodiment, the user enters a URL of a page into area 318 and selects "Create Shortpage" button 320. After a shortpage is created, its name will be displayed in Shortpages column 332. An existing shortpage can be viewed ("Go"), edited, options edited, or deleted by selecting the corresponding action in action box 330 and selecting a name of an existing shortpage.

FIGS. 3(b)–3(e) are an example of the HTML source code for an exemplary shortpage, similar to the StartPage of FIG. 3(a). This source code is included for the purpose of example and is not to be taken in a limiting sense.

Figure 4A:
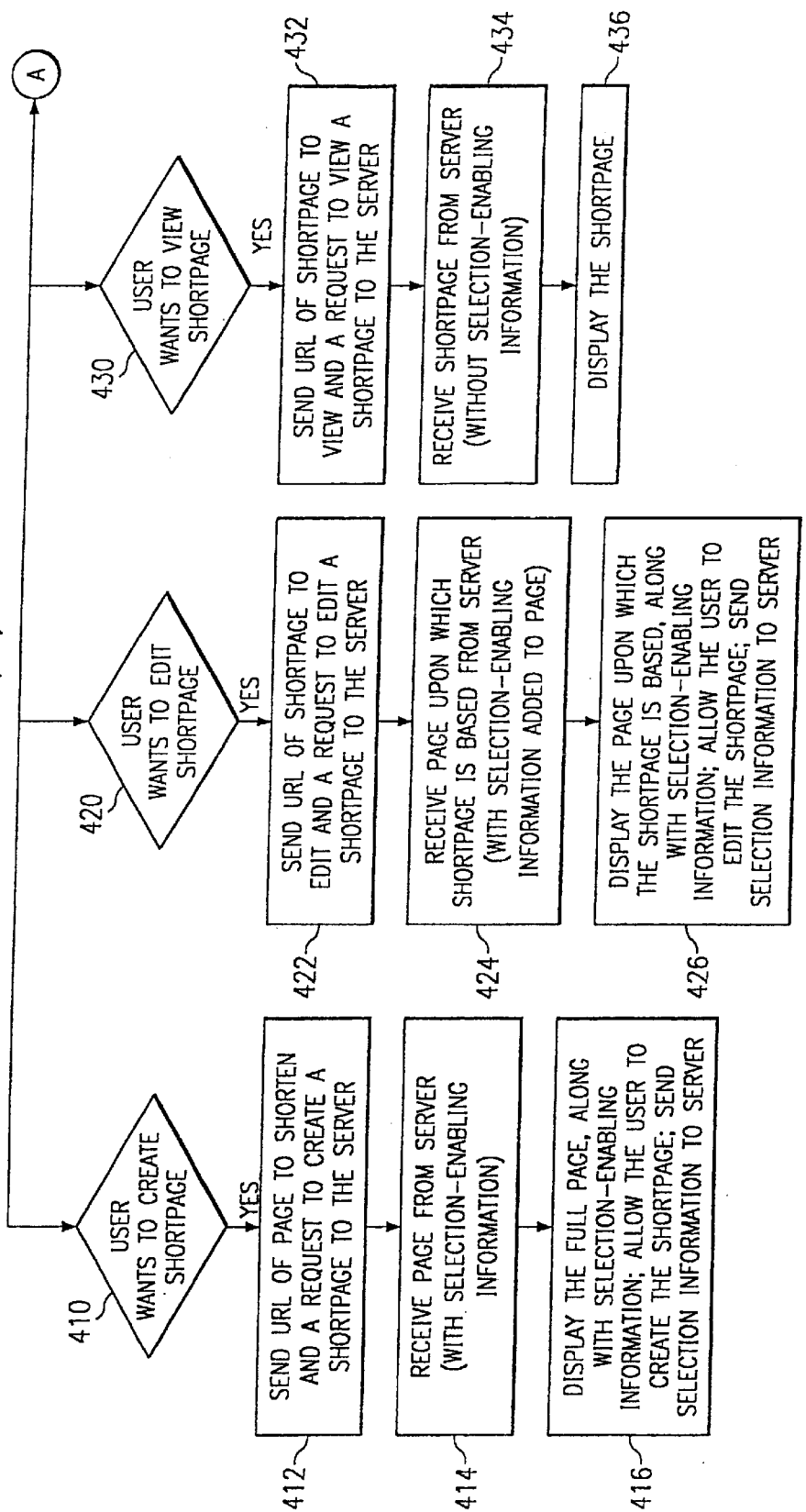
FIGS. 4(a)–4(c) are flow charts showing how a client and a server interact to perform shortpage operations, such as create, edit, delete, and view.
Figure 4C:
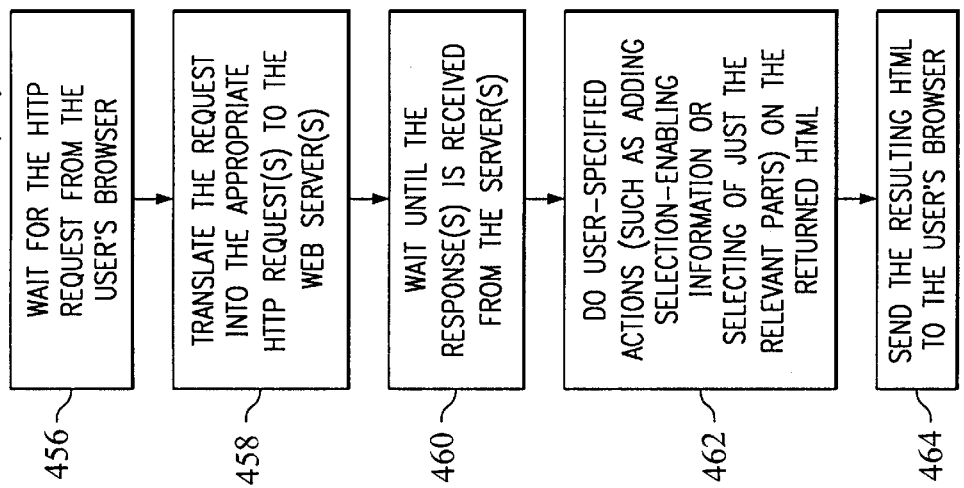
Figure 4B:
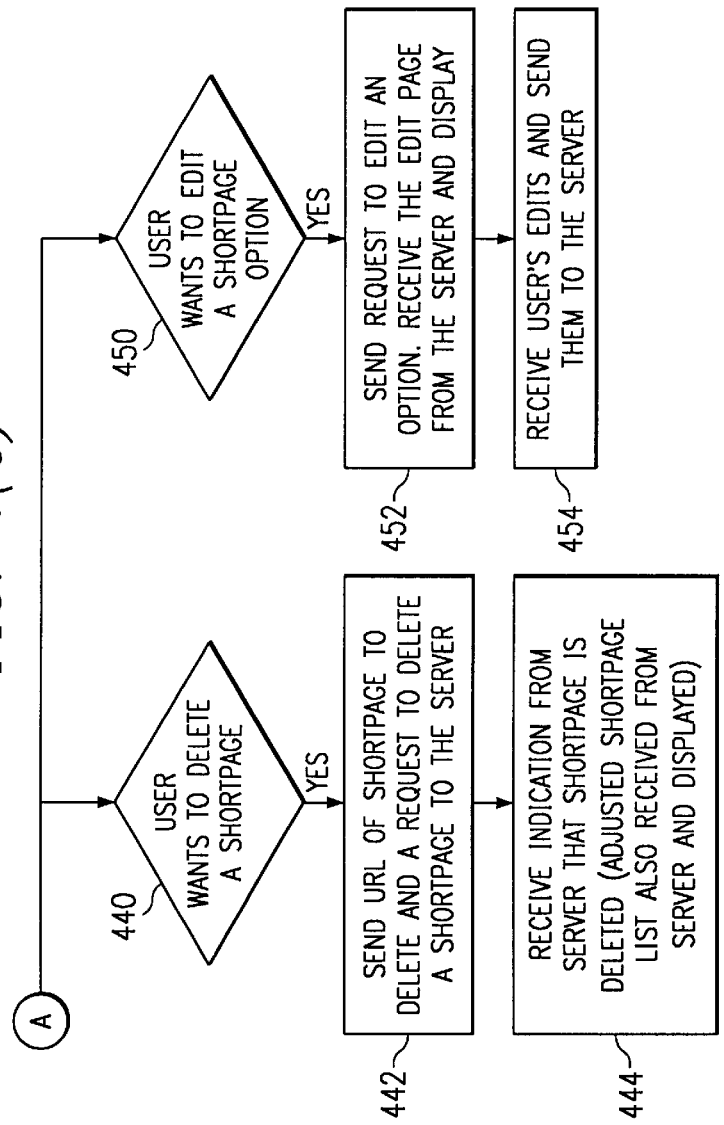

FIGS. 4(a)–4(c) are flow charts showing how a client and a server interact to perform shortpage operations, such as create, edit, delete, and view. FIGS. 4(a) and 4(b) show a method performed by the client. In the described embodiment, the functionality of FIGS. 4(a) and 4(b) are implemented via a Java Script executed by the client browser, although any appropriate implementation can be used. FIG. 4(c) shows a method performed by server 120.

In FIGS. 4(a) and 4(b), the client receives the user's actions (e.g., entering the URL of a web page and clicking "Create shortpage") and determines whether the user wants to create a shortpage (element 410), edit a shortpage (element 420), view a shortpage (element 430), delete a shortpage (element 440), or edit an option (element 450).

If the user wants to create a new shortpage (element 410), the client sends the URL of the page to shorten and a request to create a shortpage to server 120 (element 412). The client receives a page created from the requested page and from selection-enabling information (element 414). In the example, the selection-enabling information allows the user to indicate that sub-elements of the page are shown or hidden. The client then displays the page (element 416), and allows the user to create a shortpage as described below. The resulting selection information is sent to server 120. In the described embodiment, selection information is sent to the server each time a page element is marked as "shown" or "hidden." In return, a new preview of the shortpage is sent from the server to the client, so that the preview view of the shortpage reflects the currently shown/hidden element. The server adds the name of the shortpage to the list of shortpages 332 on the page.

If the user wants to edit a shortpage (element 420), the client sends the URL of the shortpage to edit and a request to edit a shortpage to server 120 (element 422). The client receives a shortpage created from the original fullpage including selection-enabling information (element 424). The selection enabling information includes show/hide buttons and header links. The client then displays the page (elements 426) upon which the shortpage is based, including the selection-enabling information, and allows the user to edit the shortpage as described below. The resulting selection information is sent to server 120. Note that the show/hide buttons can instead be implemented as a one-button user interface, or by using some other appropriate type of user interface that allows the user to choose a subset of the web page elements.

If the user wants to view a shortpage (element 430), the client sends the URL of the shortpage to view and a request to view a shortpage to server 120 (element 432). The client receives the shortpage from server 120 (element 434). The shortpage to be viewed does not include any selection-enabling information. The client then displays the shortpage (element 436).

If the user wants to delete a shortpage (element 440), the client sends the URL of the shortpage to delete and a request to delete a shortpage to server 120 (element 442). Server 120 deletes the shortpage and returns an indication to the client that the shortpage has been deleted element 444). The server removes the name of the shortpage from its list of shortpages 332.

If the client wants to edit options for a shortpage (element 450), the client send the URL of the shortpage and a request to edit the options of the shortpage. The client receives the edit page from server and displays it (element 452). The user then edits the options and sends the edits to the server (element 454).

FIG. 4(c) shows an overview of an exemplary shortpage method on the server side. When the server receives a request from the client's browser to create, edit, delete, or view a shortpage or option (element 456), the server translates the request into the appropriate request(s) to the web server(s) (element 458) and retrieves the requested web page(s) or site(s) from the server(s) (element 460). In the described embodiment, these request are HTTP requests and the web pages are written in HTML or a similar hypertext language. The server does the user-specified action (such as adding selection-enabling information when a shortpage is to be created or edited) or selecting the relevant parts of the web page (when a shortpage is to be viewed) (element 462). For example, the server adds the selection-enabling information to the retrieved web page and send the resulting page to the client's browser element 464). Table 1 shows an example of Web Procedure Calls (WPCs) used to communicate between the client and the server. The WPC is part of the URL sent by the client and has the format:

/UserName=<username>&ProcName=<procname>{&arg1=val1}{&arg2=val2} . . . {&arg last=vallast} where a string in pointed brackets "<" ">" indicates a type of data and a string in curly brackets "{" "}" indicates optional arguments.

II. Creating/Editing a Shortpage

The following paragraphs provide exemplary details of how to create/edit a shortpage. The example shown is based on an exemplary web page shown in FIG. 5(a). The web page shown has a URL of http://abc.gov. In the example, a user visits this web site frequently and desires to select sub-elements of the web site to be placed on a shortpage. If the user desires to create a shortpage based on the web page of FIG. 5(a), he enters the URL of the web page into address 318 of FIG. 3 and selects "Create Shortpage" button 320. The server will retrieve the requested web page and add selection-enabling information to the page.

Figure 5A:
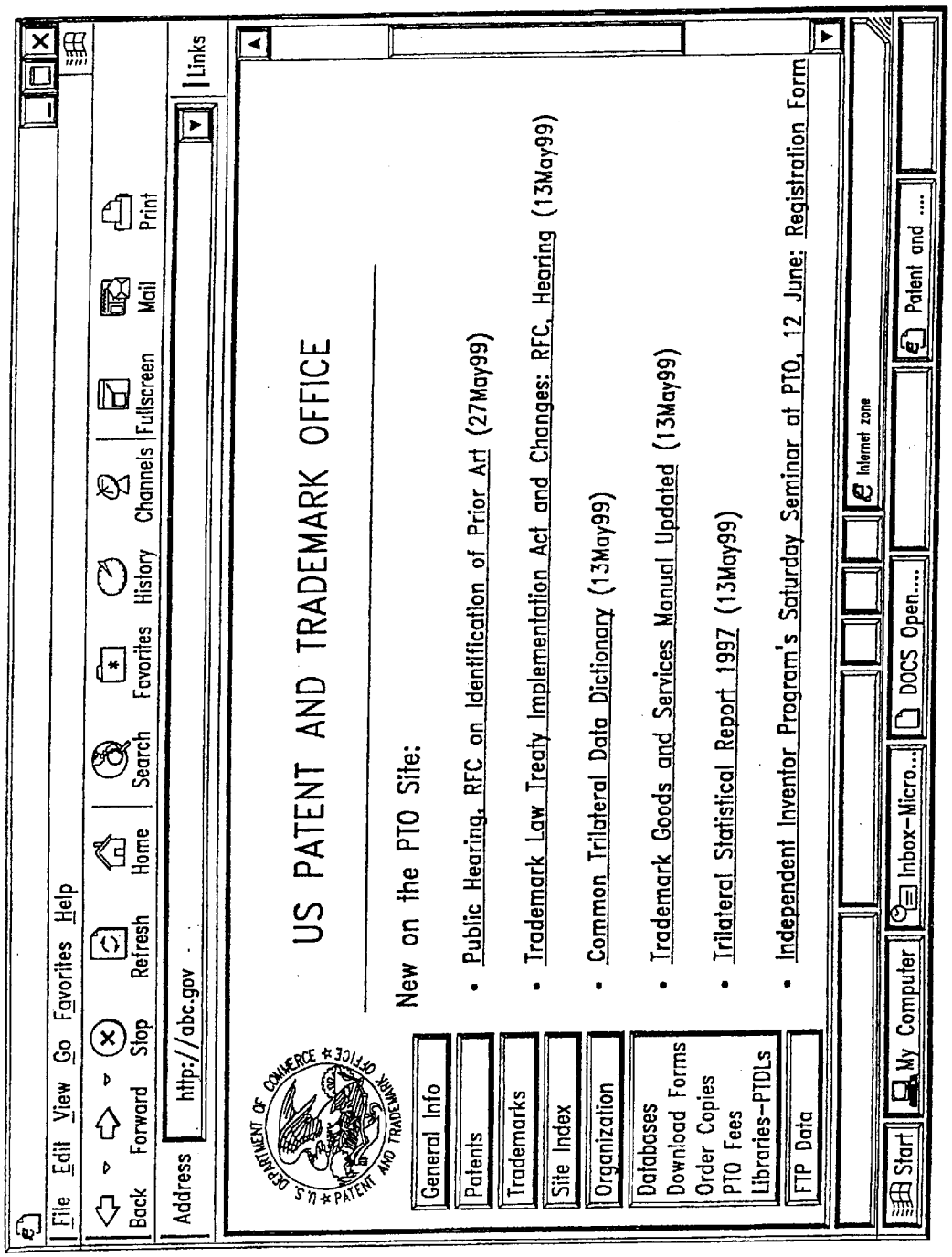
FIG. 5(a) shows a display of an exemplary web page.
Figure 5B:
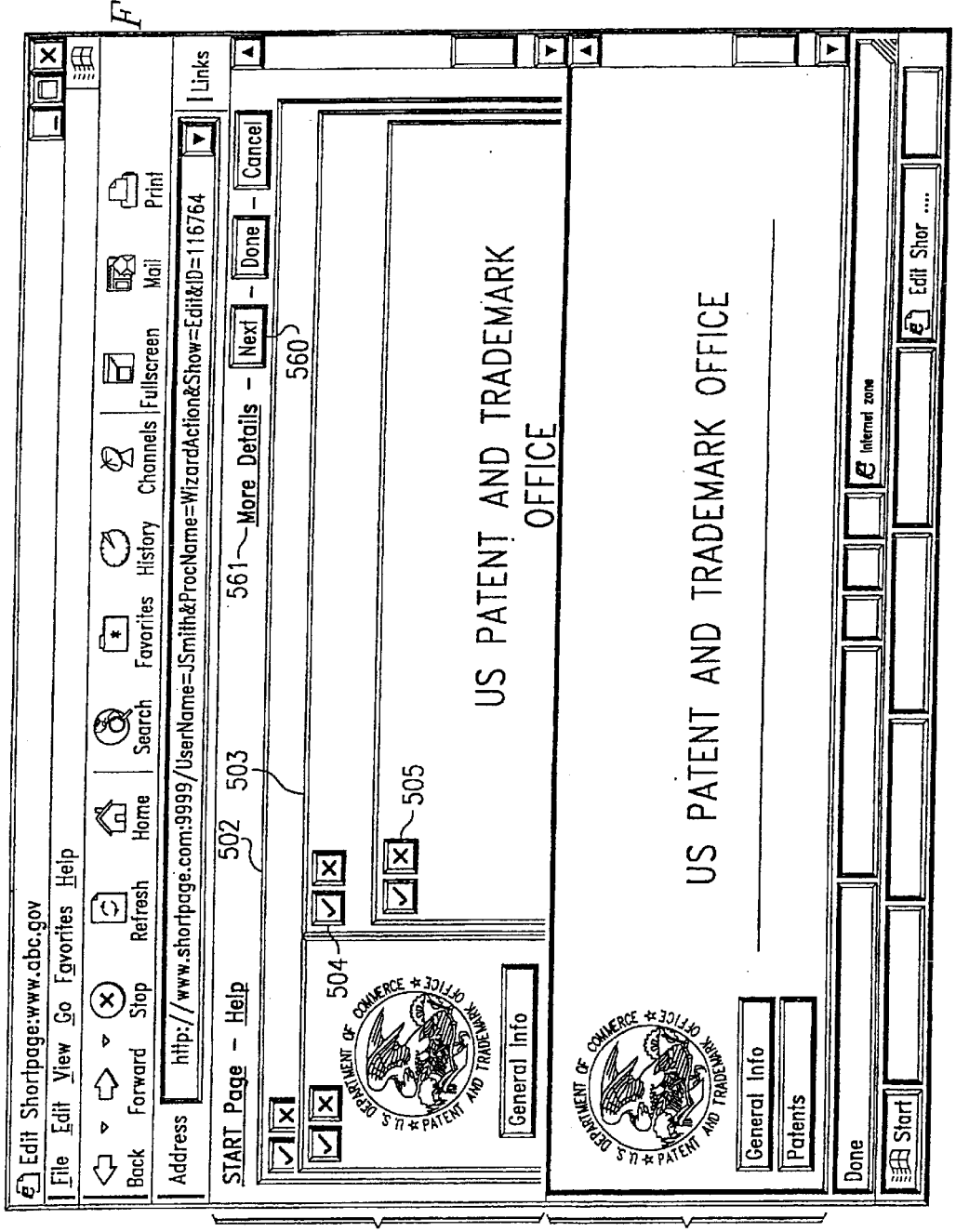
FIGS. 5(b) and 5(c) show the web page of FIG. 5(a) displayed along with selection-enabling information.
Figure 5C:
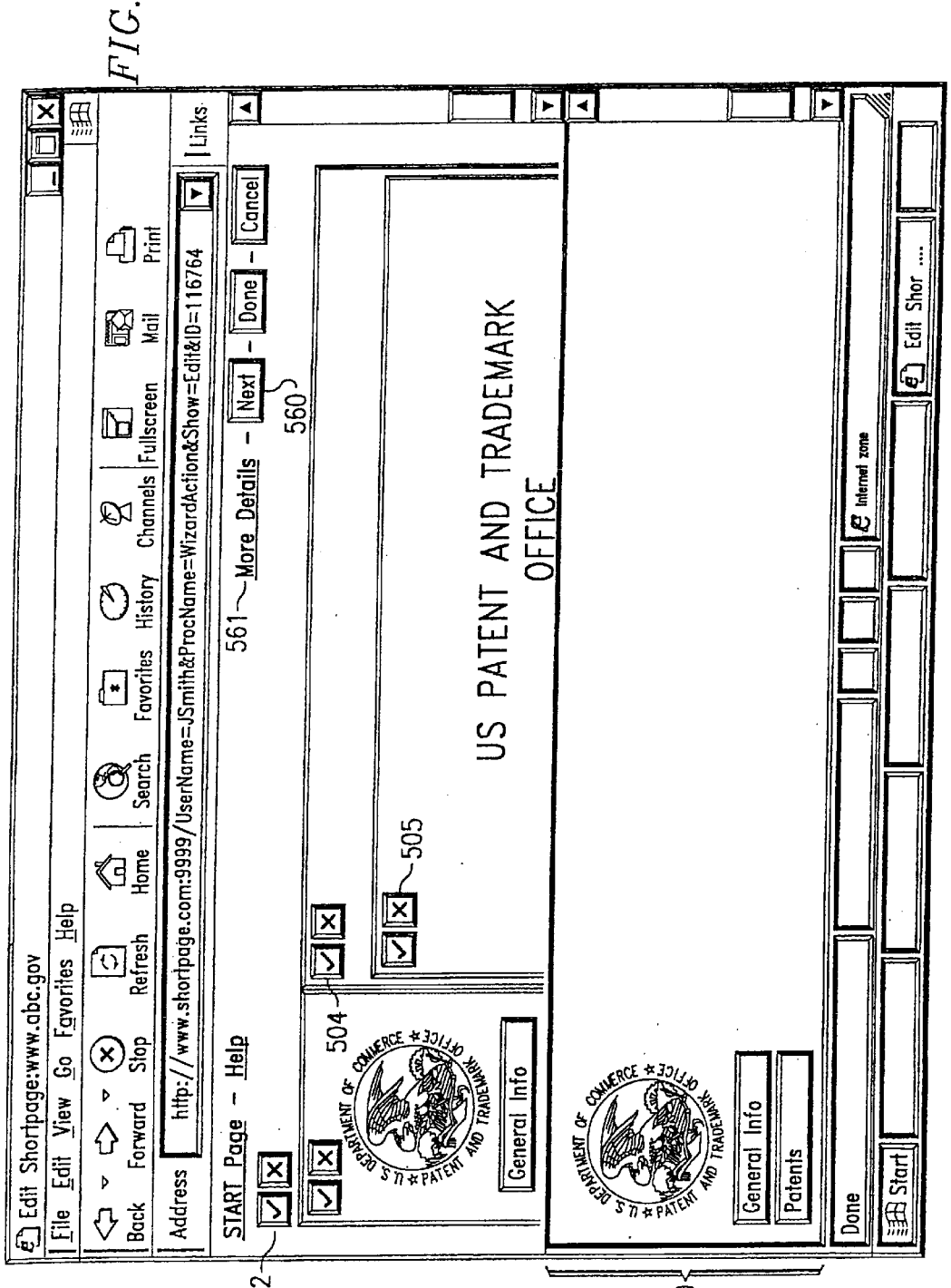

FIGS. 5(b) and 5(c) show the web page of FIG. 5(a) displayed along with selection-enabling information. The server has broken the web page into blocks, 502, 503, 504 and 505, each block having selection-enabling information. In the described embodiment, the selection-enabling information is a pair of show/hide boxes, having a check mark and an "X" respectively. The check mark indicates that the corresponding block will be shown in the shortpage. The "X" indicates that the corresponding block will be hidden (not shown) in the shortpage. FIG. 5(b) shows an editing area 510 and a preview area 520. Each of these areas can be sized and scrolled by the user. Initially all blocks in the page are marked as "hide." The example of FIG. 5(b) shows all blocks marked as "show." Therefore, in the example, preview area 520 shows all blocks in the page. In contrast, in FIG. 5(c), the user has clicked on the "X" box 505, causing the corresponding block 504 to be hidden in the shortpage. Note that the block 504 is not shown in the preview area 520 of FIG. 5(c).

Figure 5D:
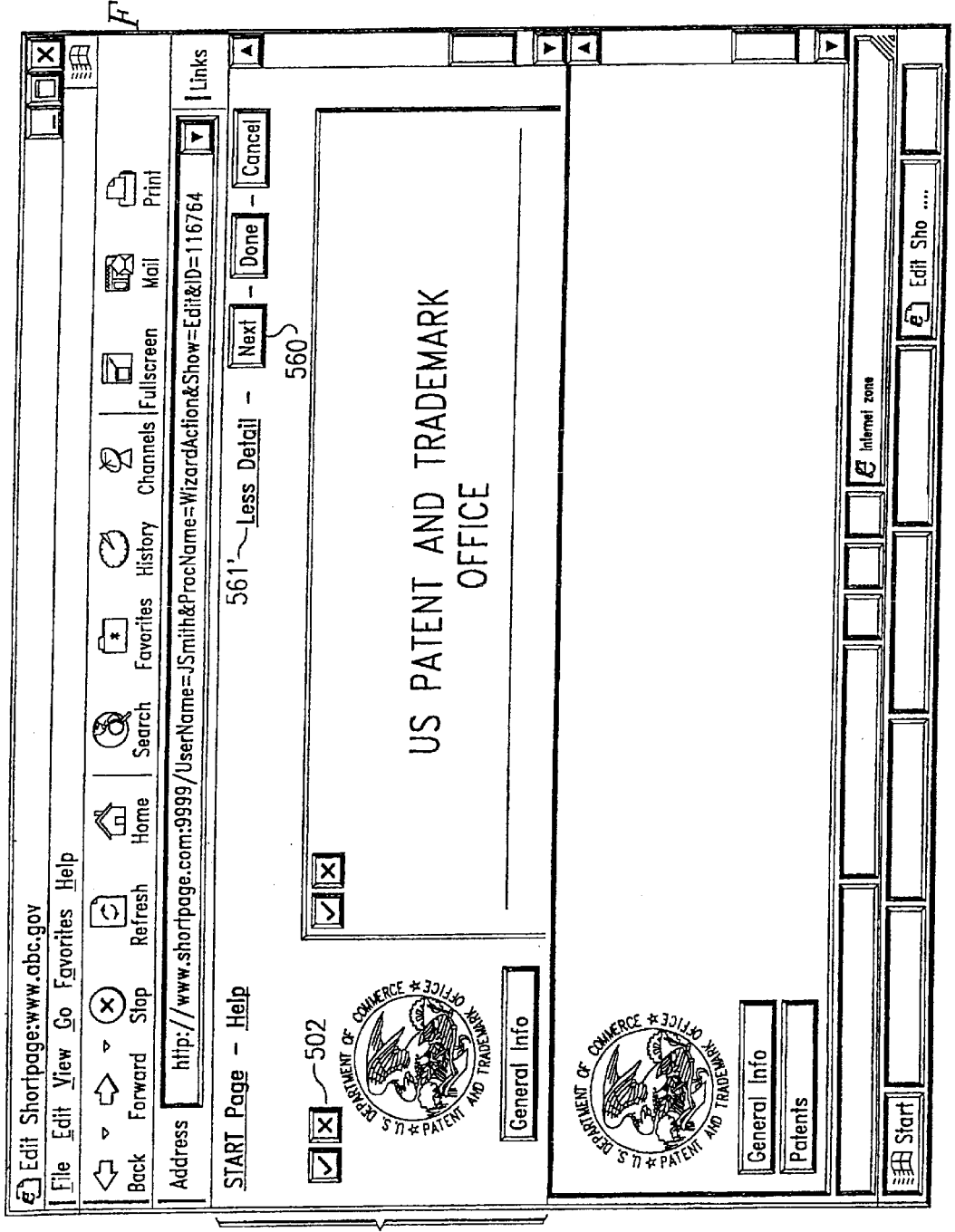
FIG. 5(d) shows the web page of FIG. 5(b) with a different level of block detail.

FIG. 5(d) shows the web page of FIG. 5(a) with a different level of block detail. When the user clicks "more details" link 561 of FIG. 5(c), a command is sent to the server and the server re-determines the blocks of the page using a higher level of detail than previously used. (A similar "less detail" button 561' is displayed on the web page of FIG. 5(d)). A method of determining blocks on a page in accordance with a current level of detail is described below in connection with FIG. 9. In FIG. 5(d), for example, the page is broken into fewer blocks 502. For example, block 504 does not exist in editing area 510.

Figure 5E:
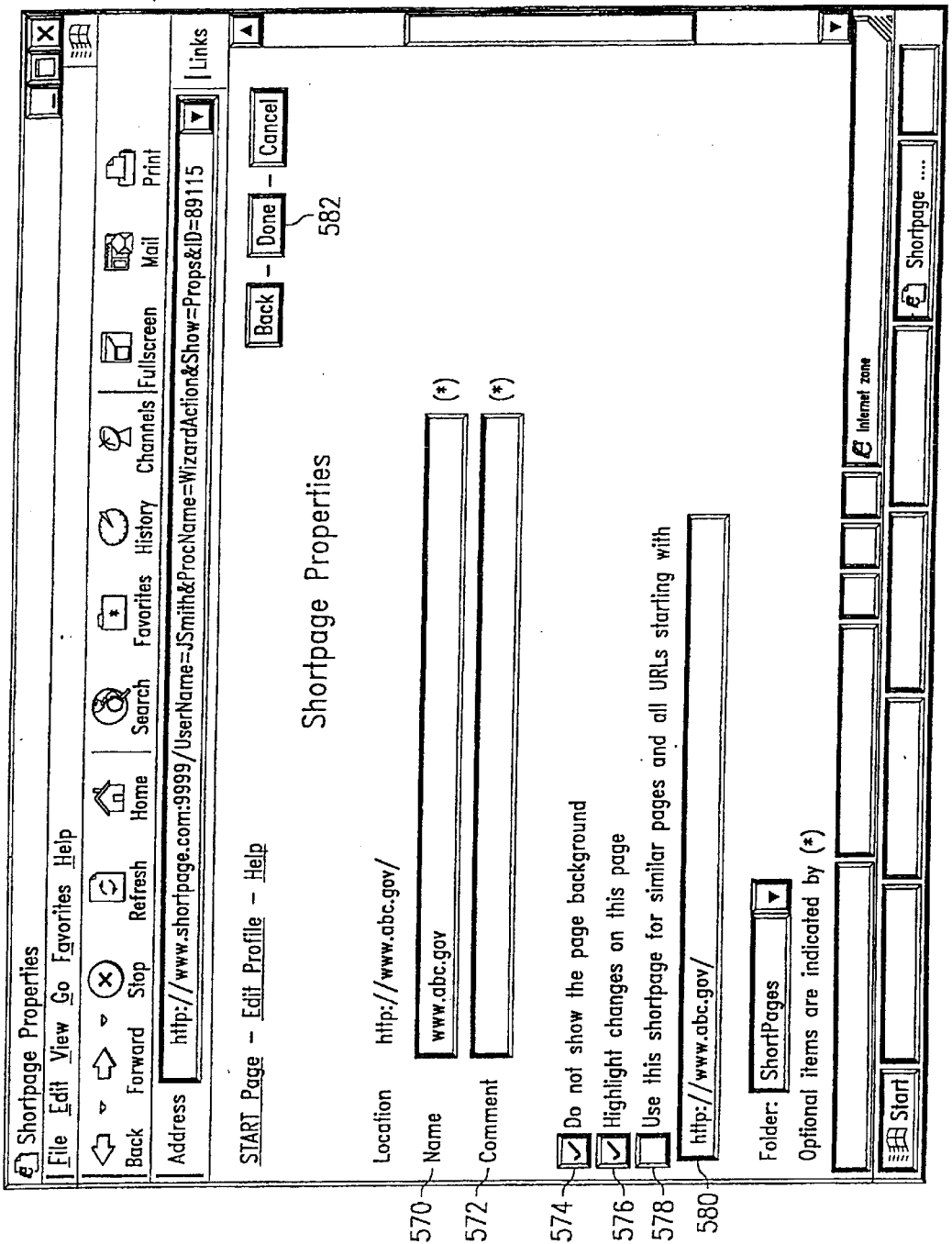
FIG. 5(e) shows a web page that allows the user to view/edit shortpage properties.

FIG. 5(e) shows a web page that allows the user to view/edit shortpage properties. The web page of FIG. 5(e) is requested when the user clicks on "Next" link 560, as shown in FIGS. 5(b)–5(d). This page allows the user to enter properties of a shortpage. The user can change the name associated with the shortpage (for example, the name shown in area 332 of FIG. 3) by entering a new name in area 570. The user can enter comments in area 572. The user can indicate that the shortpage does not show the page background in area 574. The user can indicate that changes since the last time the shortpage was viewed should be highlighted on the shortpage in area 576. The user can indicate that the shortpage should be used for similar pages and all URLs starting with a specified string (areas 578 and 580). Other properties could be included or certain properties shown in the figure excluded without departing from the spirit or scope of the invention. When the user clicks a "Done" button 582, the client sends the entered information to server 120, which stores the entered information in connection with the shortpage.

Figure 6:
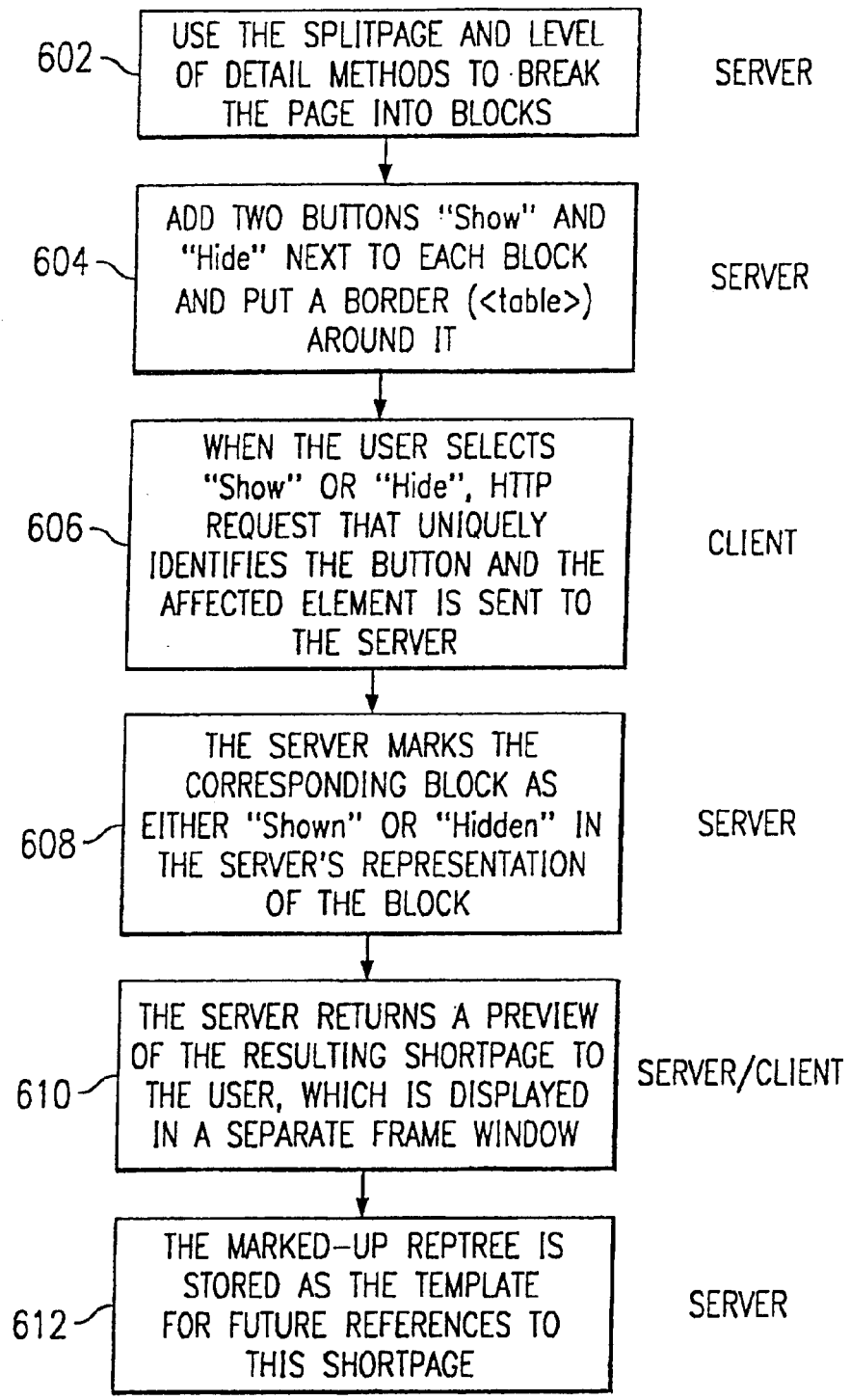
FIG. 6 is a flow chart showing how the client and the server interact to allow the user to create/edit a shortpage.

FIG. 6 is a flow chart showing how the client and the server interact to allow the user to create/edit a shortpage. Each element of the flow chart has a notation next to it indicating whether it is preferably performed by the client, server, or a combination. In element 602, after the server has retrieved a page from a web server, the server needs to break the page down into blocks and to add selection-enabling information to the page of reach block. The server uses the SplitPage method (FIG. 8) and the Level of Detail method (FIG. 9) to break the page into blocks. In element 604, the server adds selection-enabling information to the retrieved web page. Specifically, the server adds a "Show" button and a "Hide" button next to the block and puts a border (<table>) around it. The client's browser, thus, displays the web page along with the selection-enabling information for each block.

In element 606, when the user selects "Show" or "Hide," an HTTP request that uniquely identifies the button is sent to the server (see Table 1). In element 608, the server marks the corresponding block as either "shown" or "hidden" in the representation tree (RepTree) for the shortpage. This information is a part of the selection information stores on the server. In element 610, the server returns a preview of the resulting shortpage to the user, which is displayed in a separate frame (preview area 520). The marked-up RepTree is stored as the template for future references to this shortpage in element 612. Thus, the RepTree forms at least part of the selection information. It will be understood that, although the example shows certain action being performed by the client or the server, other embodiments may implement the client or server to perform actions not shown as being performed by them. For example, the selection information could be stored on the client side.

Figure 7:
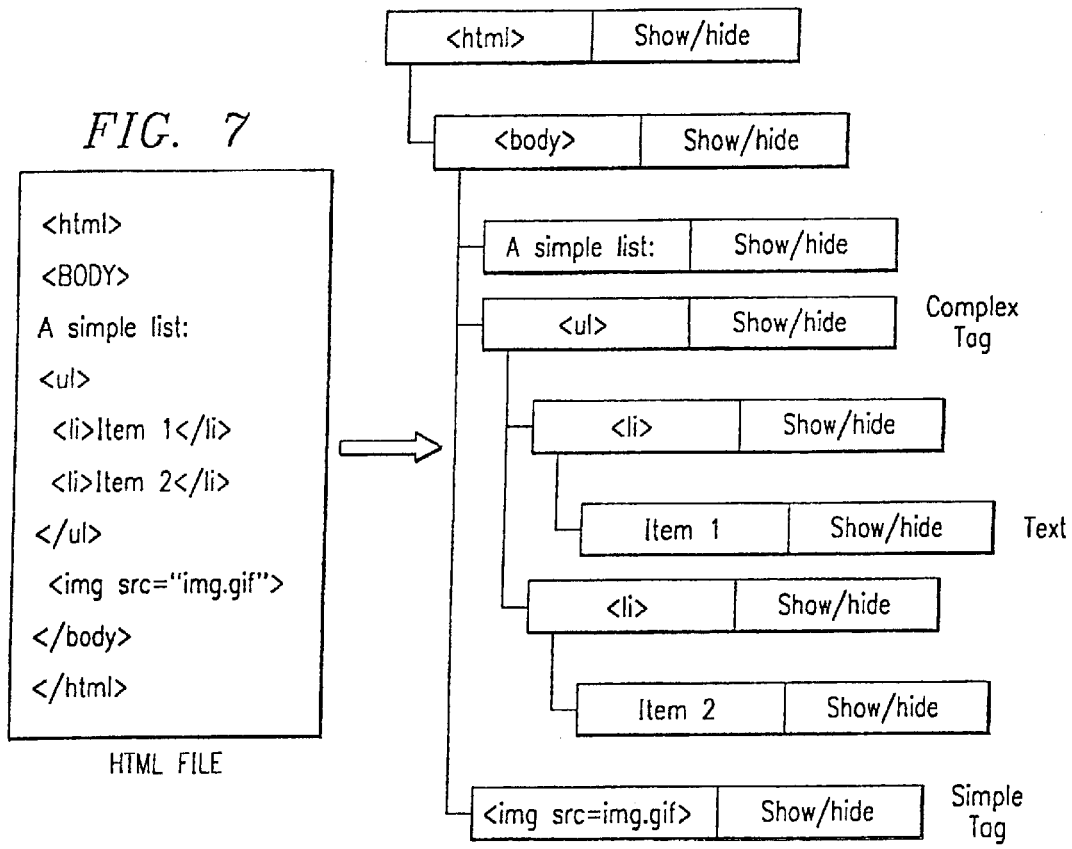
FIG. 7 shows an example of HTML parsing used to create/edit shortpages.

FIG. 7 shows an example of parsing used by the server to create and edit shortpages. This figure shows the Split Page method. In the example, the page is represented by an HTML file. The HTML is parsed in a manner known to persons of ordinary skill in the art to yield a Representation Tree. The Representation Tree has complex/multipart tags (e.g., <ul>), simple tags (e.g., <image src=Img.gif>), and text nodes (e.g., item 1). A simple tag is defined as a tag that has no children and a complex tag is defined as a tag that has children. Server 120 parses the HTML file into a RepTree and iterates down the tree in a depth-first way to mark each node in the tree according to whether it is a single block. The RepTree includes a flag for each block indicating whether it is shown or hidden. A detailed example of the format of a RepTree is shown in Table 2. This format is not to be taken in a limiting sense.

Figure 8:
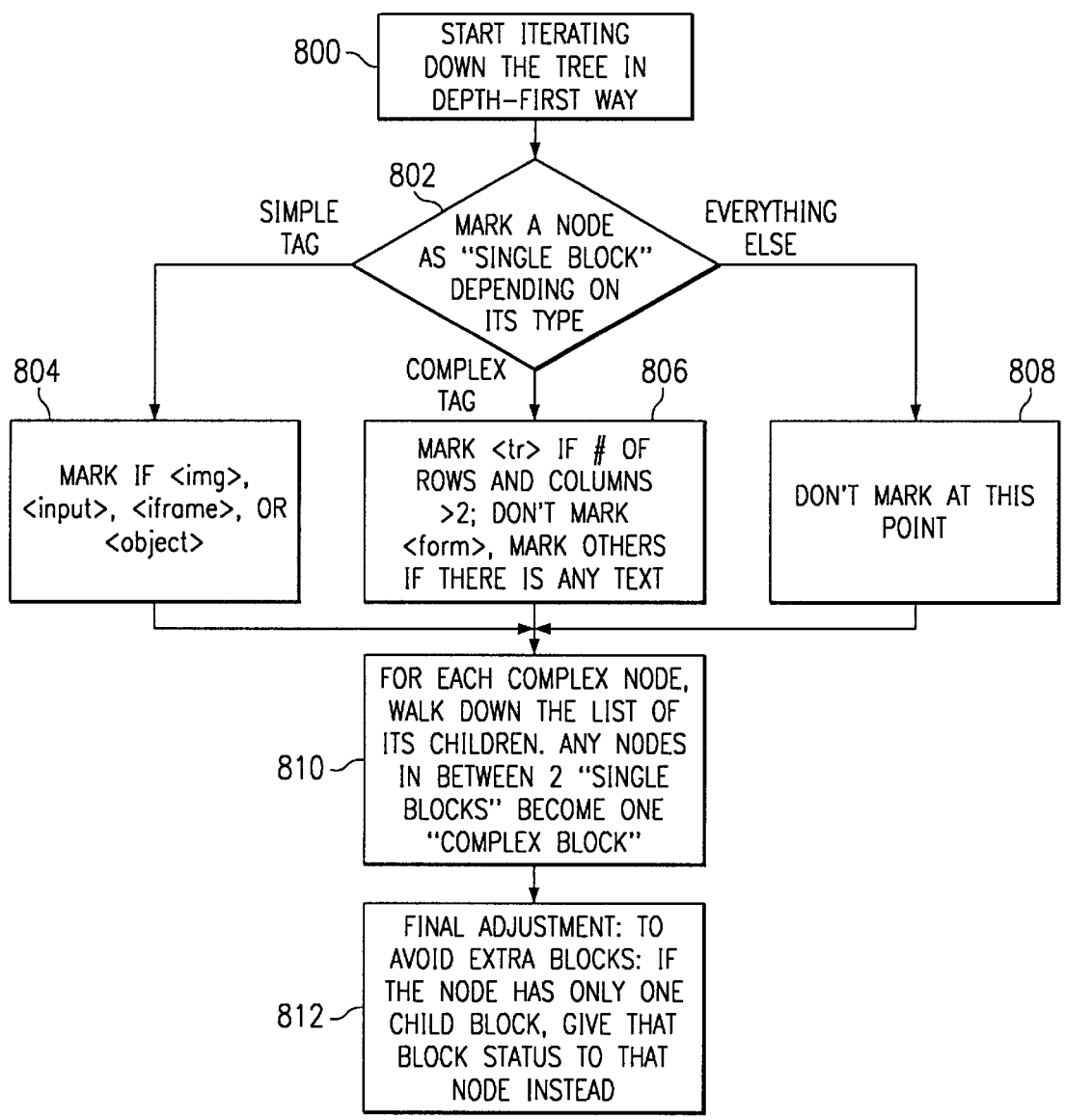
FIG. 8 shows an example of a split page method used to create/edit shortpages.

FIG. 8 shows an example of a split page method used to create/edit shortpages. As shown in FIG. 8 after start iterating (element 800), node type is determined (element 802), if a node corresponds to a simple tag that is an image, input, iframe, or object, it is marked as a single block (element 804). If a node corresponds to a complex tag of type <tr> and there are more than two rows or columns in the table, mark the node (element 806). If a node corresponds to a complex tag of type <form>, do not mark the node (element 806. If a node corresponds to a complex tag of other types, mark the node if it has any text (element 806). For other types of nodes, continue traversing the RepTree (element 808). For each complex node, walk down the list of its children (element 810). Any nodes between two single blocks become one complex block. To avoid crating extra blocks, if a node has only one child block, give the block status to the parent node instead (element 812).

Figure 9:
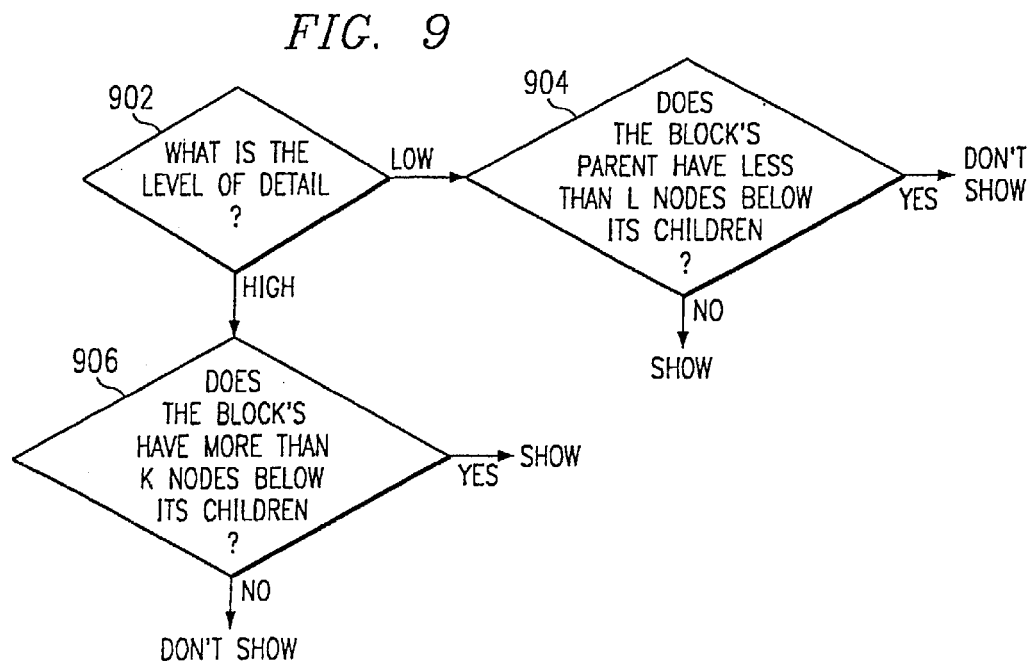
FIG. 9 is a flow chart of how to determine a display level when creating shortpages.

FIG. 9 is a flow chart of how to determine a display level when creating shortpages. In the described embodiment, the level of detail is used to decrease the number of blocks displayed at a given time. This flow chart demonstrates how to work with two levels (high and low), but any number of levels can be supported. If the level of detail is low, determined at element 902, element 904 determines whether the block's parent has less than L nodes below its children. L can be, for example, 5. If the block's parent has less than L nodes below its children, the block is shown as a separate block when the user creates or edits a shortpage. Otherwise, the block is not shown as a separate block. If the level of detail is high, determined at element 902, element 906 determines whether the block has more than K nodes below its children. K can be, for example, 1. If the block has more than K nodes below its children, the block is shown a as a separate block when the user creates a shortpage. Otherwise, the block is not shown as a separate block.

Figure 10:
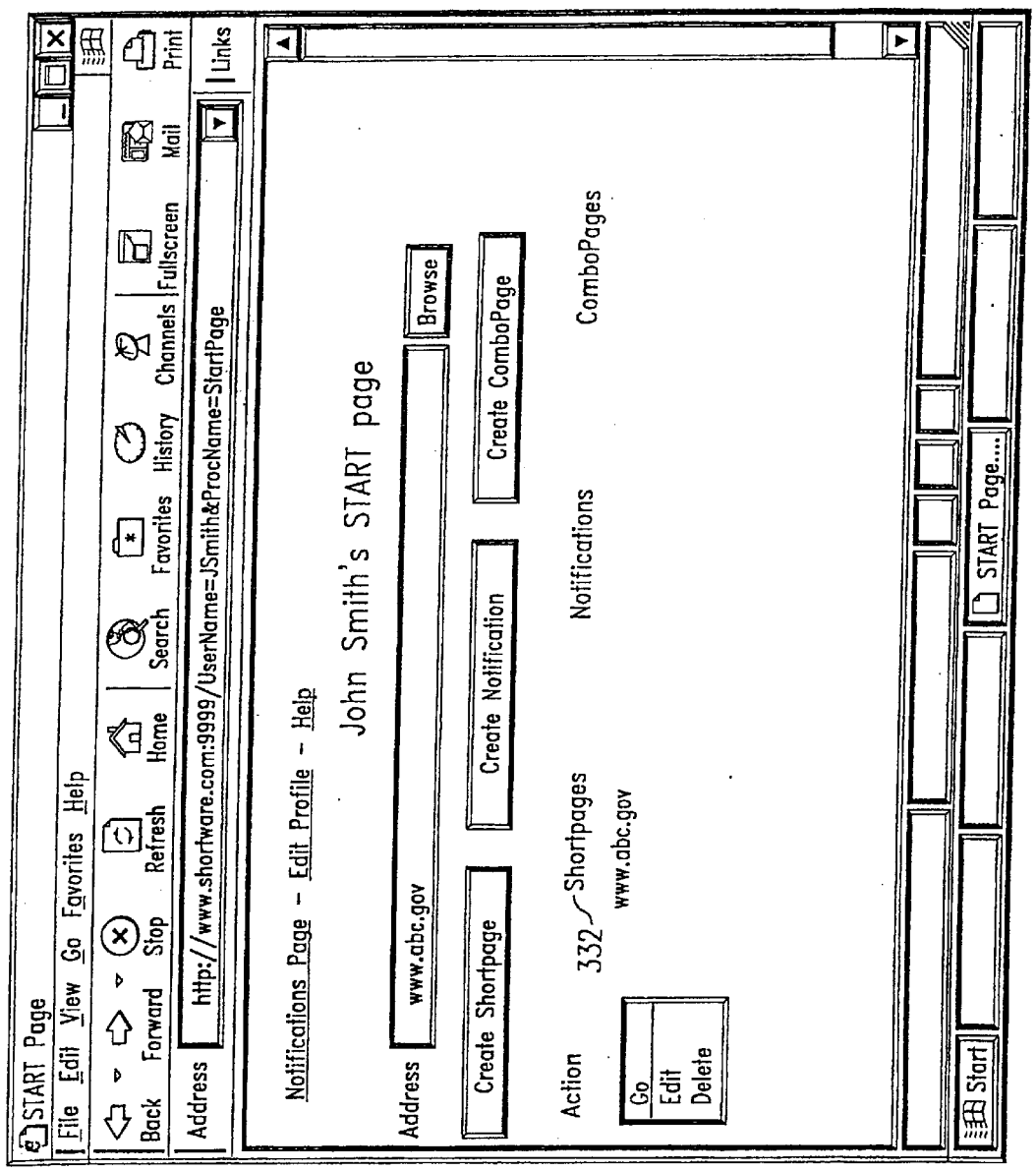
FIG. 10 shows the startpage of FIG. 3(a) after a shortpage has been created based on the web page of FIG. 5(a).

FIG. 10 shows the startpage of FIG. 3 after a shortpage has been created based on the web page of FIG. 5(a). Server 120 indicates to the client that a shortpage has been created and adds the name of the shortpage to area 332 of the user's startpage. The startpage having the name of the new shortpage is sent to the browser, where it is displayed.

Figure 11:
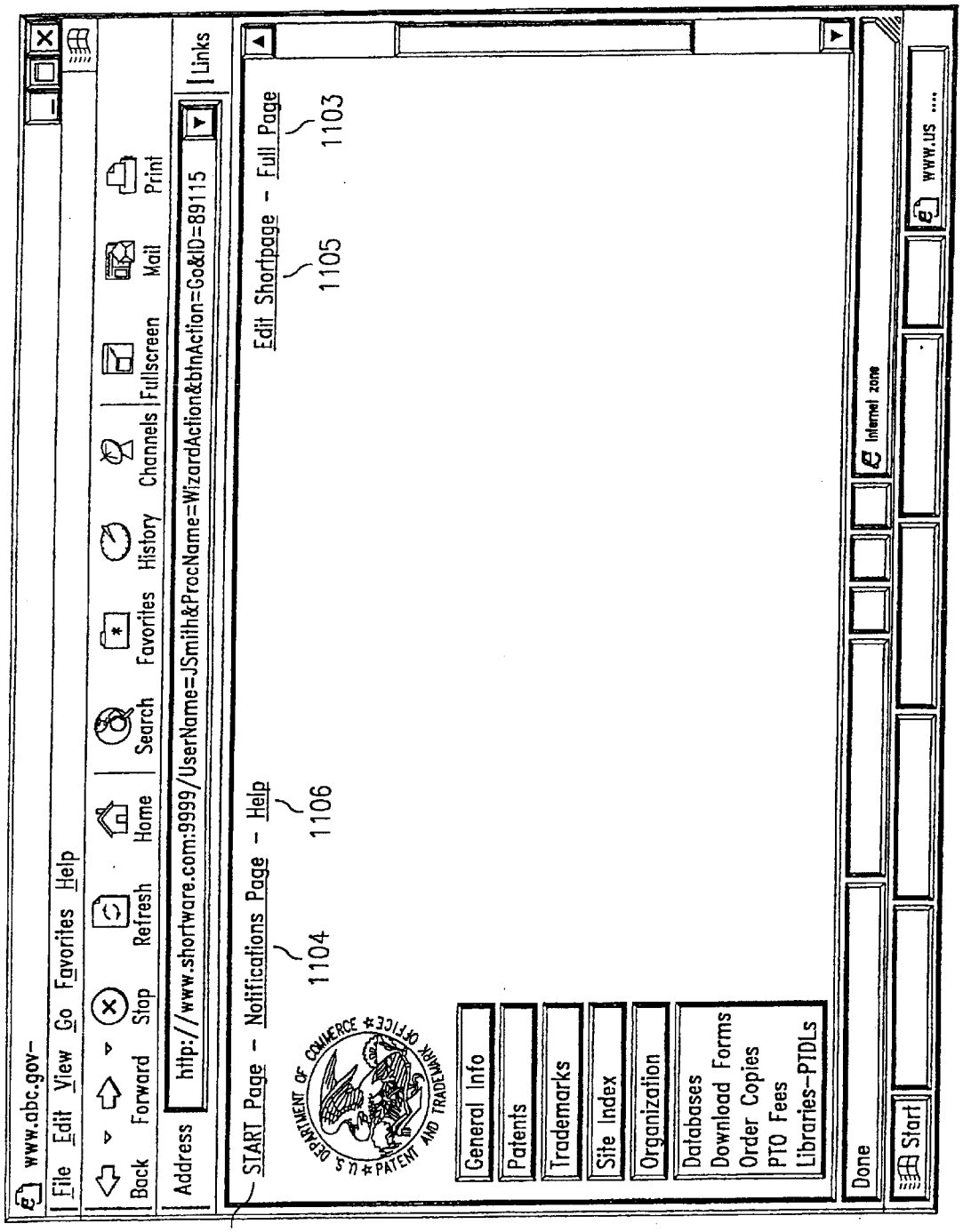
FIG. 11 shows the shortpage created from the web page of FIG. 5(a).

FIG. 11 shows the shortpage created from the web page of FIG. 5(a). In the example, the user selected certain sub-elements of the page. Specifically, the user indicated that all but a leftmost block of the page is marked as hidden. Thus, the shortpage shows only the non-hidden block. The shortpage also includes a link to the user's startpage 1102, a link to a notification page 1104, a link to a help page 1106, a link to a page that allows the user to edit a shortpage 1105 and a link to the fullpage 1103 upon which the shortpage is based. Note that the user has indicated that the background of the original page is not to be shown in this shortpage (see FIG. 5(e)).

Figure 12:
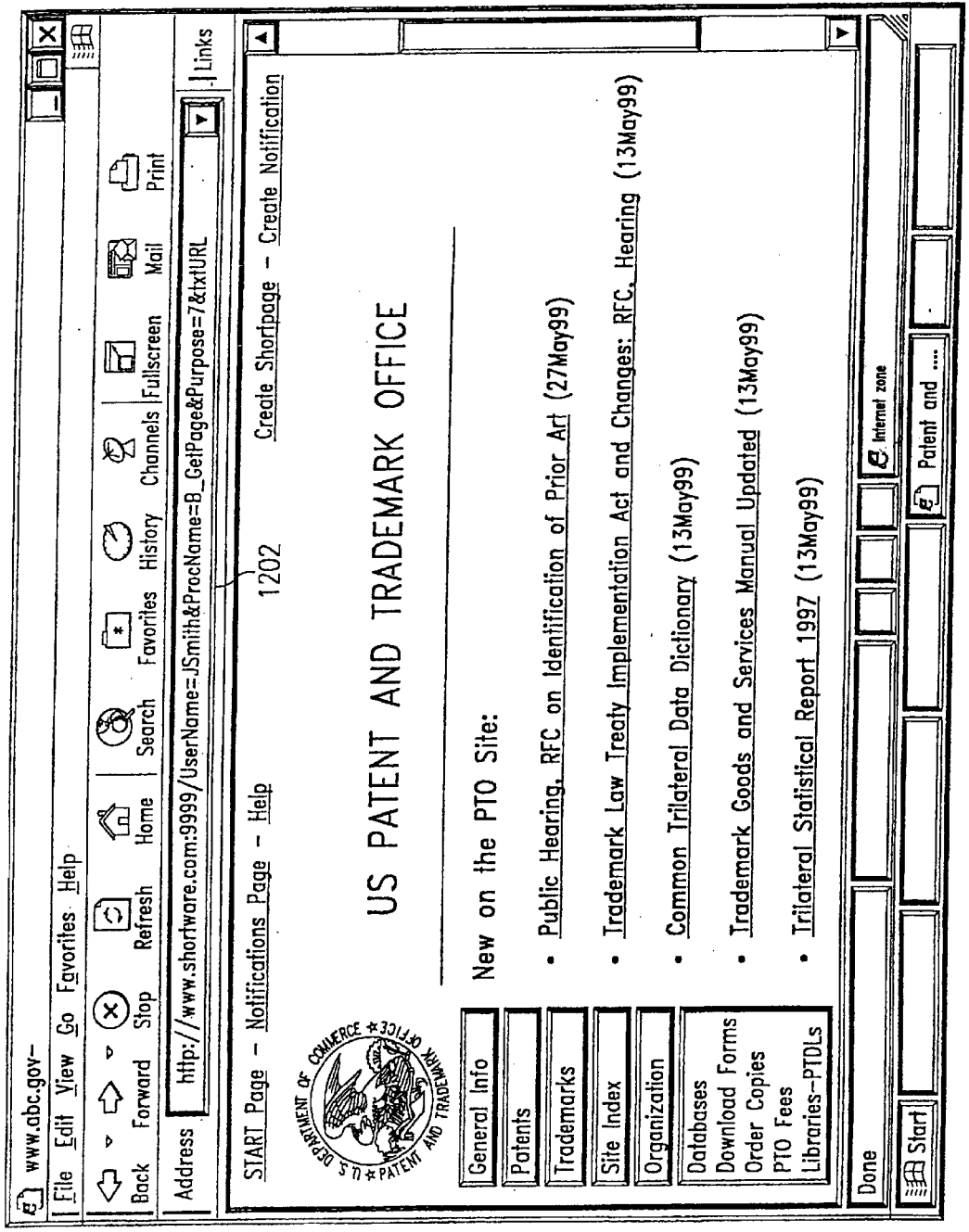
FIG. 12 shows a fullpage corresponding to the web page of FIG. 5(a).

FIG. 12 shows a fullpage corresponding to the web page of FIG. 11. The fullpage is displayed when the user clicks on the fullpage link of 1103 FIG. 11. In contrast to the shortpage, the original page's background is shown, since it is part of the page. Even though all blocks of the fullpage are shown, the full page is fetched via server 120 and not directly from the web page server. This is shown by the URL 1202 of the fullpage:

http://shortwave.com:9999/UserName=JSmith/ProcName=B_
GetPage&purpose=7&textURL=ht tp://www.abc.gov.

In this example, the user is "JSmith". The action is to get/fetch a page. "Purpose=7" indicates that a full page should be fetched. The URL of the full page is http://www.abc.gov. Further examples of parameters used to communicate between the client and the server are described in Table 1.

III. Viewing a ShortPage

Figure 13:
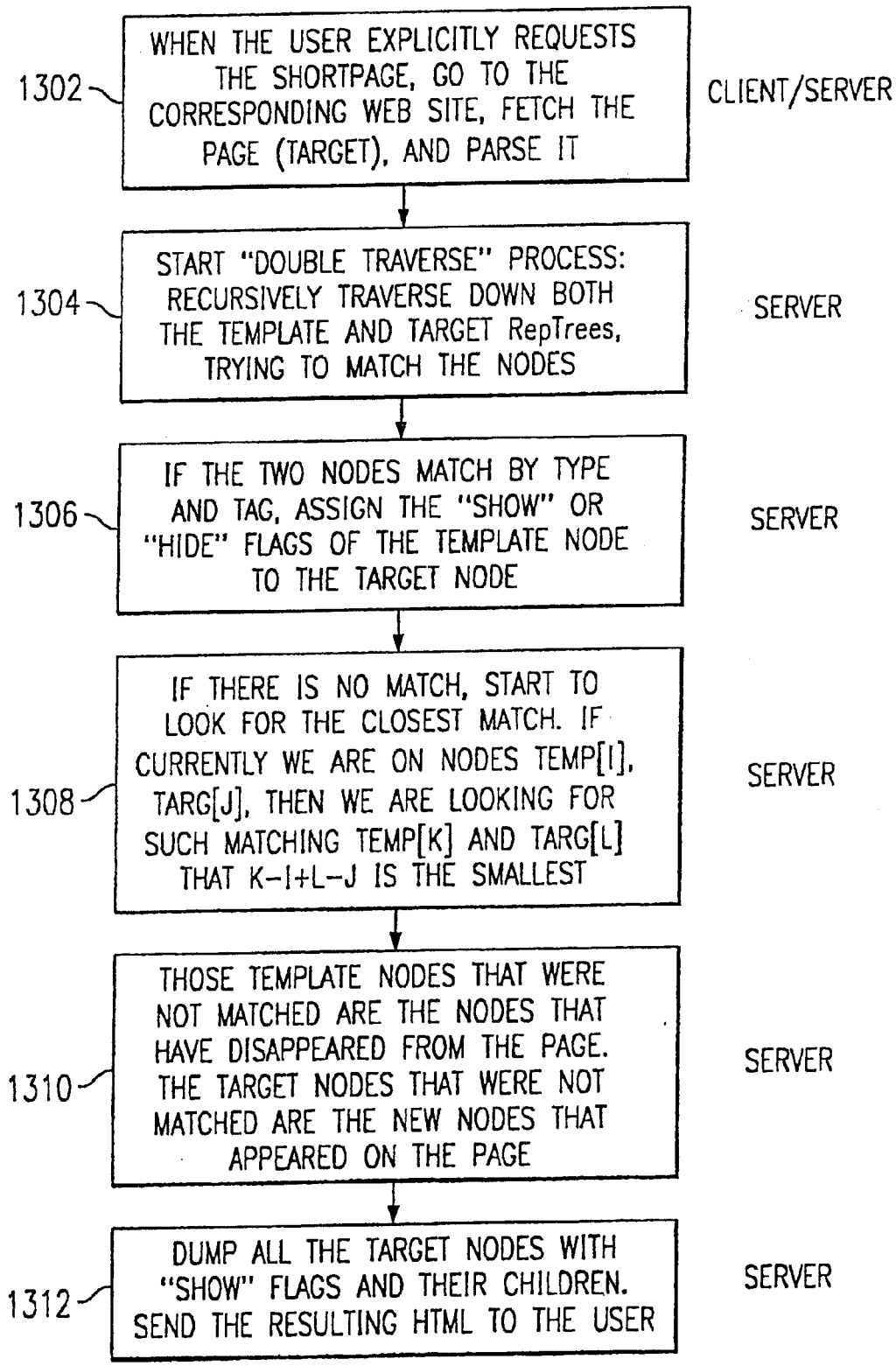
FIG. 13 is a flow chart showing how the client and server interact to allow the user to view a shortpage.

FIG. 13 is a flow chart showing how the client and server interact to allow the user to view a shortpage. In the described embodiment, the user has selected a name of a shortpage in area 332 and selected "go" in area 330. It should be remembered that, although a shortpage may be used on a particular web page, that web page may have changed since the shortpage was crated, either because content may have been changed, added, or deleted. It is necessary to parse the web page on which the shortpage is based (the target) and determine whether the blocks marked "show" in the template are still present in the target (element 1302). The target page on which the shortpage is based is retrieved and parsed into a RepTree by the server. Each shortpage has a RepTree associated with it.

In element 1304, the server performs a "double traverse" method, recursively traversing down both the template and the target RepTrees, trying to match the nodes. If two nodes match by type and tag, assign the "Show" or "Hide" flags of the template node to the target node (element 1306). If there is no match, start to look for the closest match. If, for example we are currently on nodes Temp[I], Targ[J], then we are looking for matching Temp[K] and Targ[L] such that, for K and L, K−I+L−J is the smallest possible value (element 1308).

After element 1308, any template nodes that are not matched were the nodes that have disappeared from the page (element 1310). Any target nodes that were not matched were the nodes that have been added to the page. All target nodes with "Show" flags (i.e., all target blocks that matched a block in the template) are part of the shortpage (element 1312). These blocks are sent to the requesting client. Other appropriate matching methods can also be used.

In the described embodiment, the user can enter the address of a web page to be shortened. For example, the user can enter a URL in area 318 and click on button 340. If the user has previously defined a shortpage for this URL or for a URL on this web site, the shortpage is displayed. Similarly, if a page has a link to another page within it and the link is selected, server 120 will check the new link to determine whether it is a shortpage.

Figure 14:
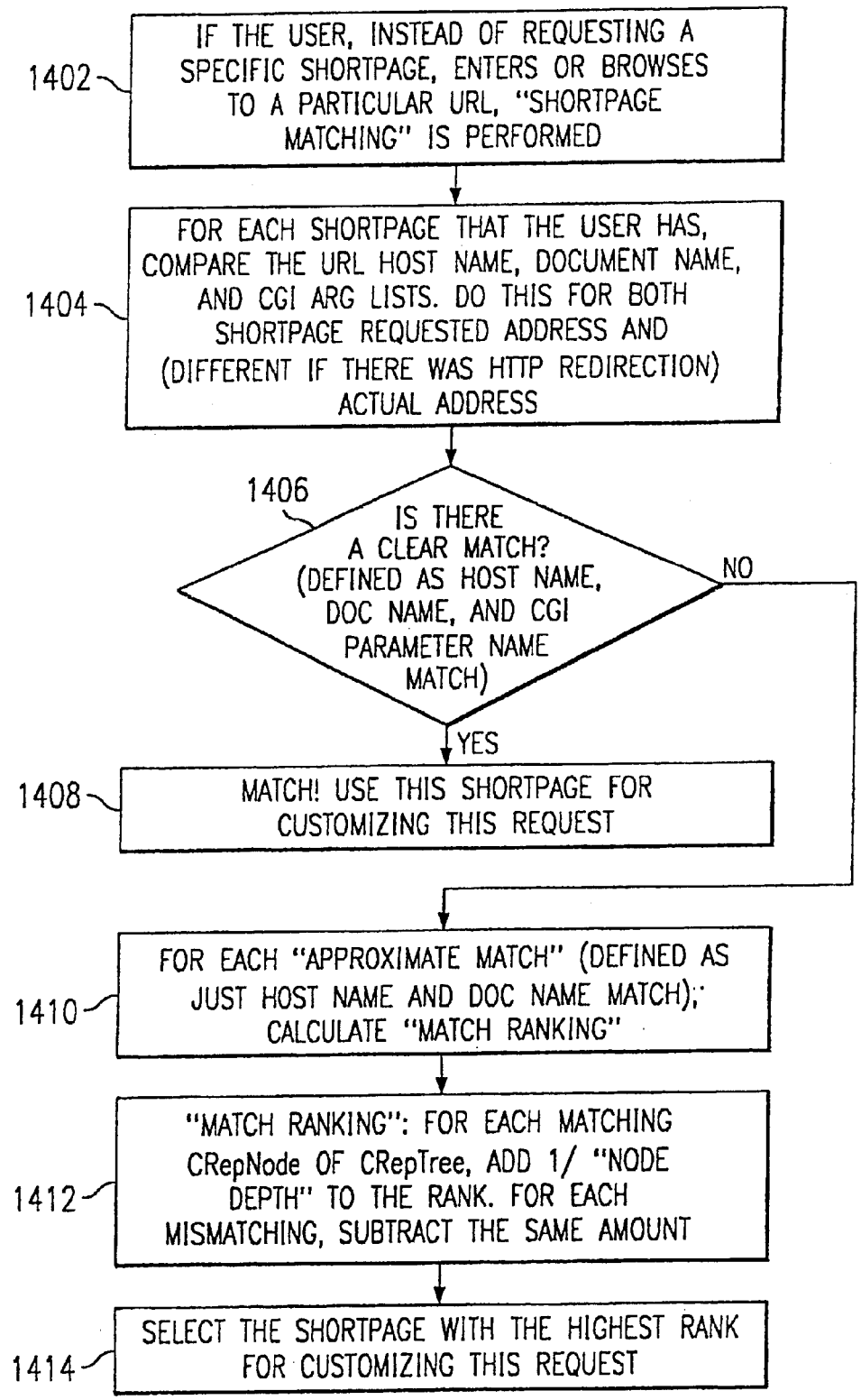
FIG. 14 is a flow chart showing details of determining whether a URL is the URL of a shortpage.

FIG. 14 is a flow chart showing details of determining whether a URL is the URL of a shortpage. As described in element 1402, this method will be used when, instead of requesting a specific shortpage, the user enters or browses to a particular URL. In element 1404, for each shortpage that the user has, server 120 compares the URL, host name, document name, and CGI argument lists. The server does this for both a shortpage requested address and for the actual address. The requested address and the actual address may be different because of HTTP redirection.

If, in element 1406, the host name, document, name, and CGI parameter names match, it is a "clear match." If a clear match occurs, use this shortpage for customizing the request (element 1408). If a clear match does not occur, control passes to element 1410. In element 1410, for each "approximate match" (which is defined as host name and document name match), calculate "match ranking." Step 1412 calculates match ranking as follows. For each matching RepNode of RepTree, add (1/(Node depth)) to the rank. For each mismatch, subtract the same amount. In step 1414, select the shortpage with the highest matching rank for customizing this request. If no match occurs, then show the full page.

IV. Handheld Client

Figure 16:
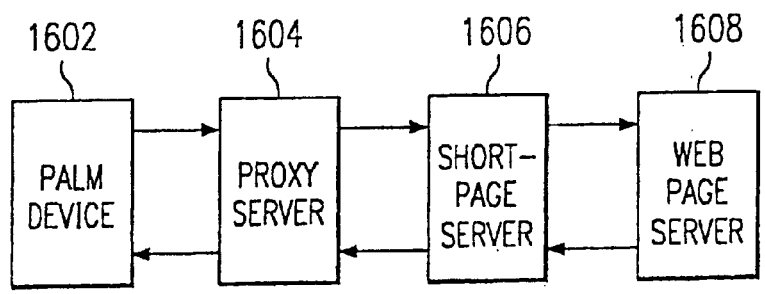
FIG. 16 is a block diagram of data flow when a shortpage is viewed on a personal digital assistant.

As discussed in connection with FIG. 1, the present invention can be implemented for a wide variety of clients. FIG. 16 is a block diagram of data flow when a shortpage is viewed on a personal digital assistant, such as a Palm VII Personal Digital Assistant (available from 3Com Corporation) or a similar handheld device. PDAs often use a "web clipping" system to view web pages. The PDA views predefined web clippings by sending a request for the clipped pages to a proxy server.

Initially, a "web clipping" application, which contains a single link to the user's startpage is created and downloaded into the user's handheld device. The user creates his shortpages as described above. Preferably, these shortpages are created on the user's PC, although other embodiments may allow the user to create them on the handheld.

To view a shortpage, the user simply goes to his startpage "web clipping" in the handheld and selects a link to the shortpage. As shown in FIG. 16, this action causes a request to be sent to the proxy server 1604, which passes the request to the shortpage server 1606, which forwards the request to the web site 1608 hosting the full page. The web site returns the requested page(s) to the shortpage server 1606, which creates a shortpage as described above and which then passes the created shortpage to the proxy server 1604. The proxy server sends the shortpage to the handheld client 1602.

Figure 15:
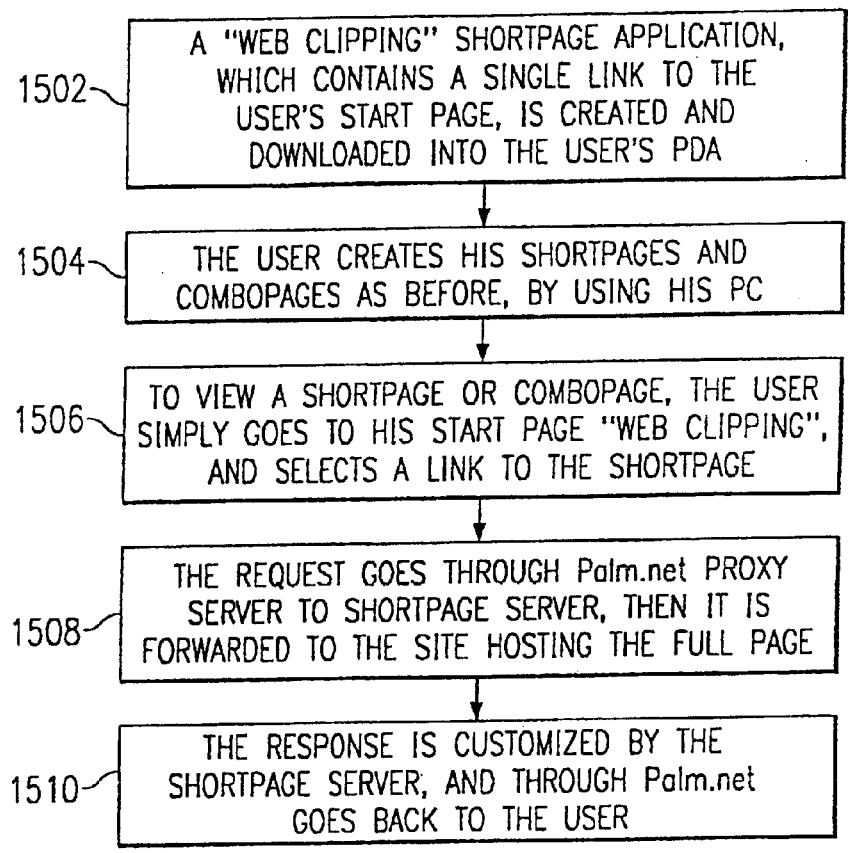
FIG. 15 is a flow chart for viewing a shortpage when the client is a personal digital assistant.

FIG. 15 is a flow chart for viewing a shortpage when the client is a personal digital assistant. In element 1502, a web clipping short page application, which contains a single link to the user's startpage is created and downloaded into the user's PDA. In element 1504, the user creates his shortpage as before, using his PC or similar device. In element 1506, to view a shortpage, the user simply goes to his startpage "web clipping" and selects a link to the shortpage. In element 1508, the request goes through a proxy server (such as palm.net of 3Com) and is forwarded to the site hosting the page or pages. In element 1510, the response from the web server is customized by the Shortpage server and goes back to the user.

In the described embodiment, the shortpage server creates a modified version of a shortpage when it knows that the client is a handheld device. For example, the shortpage server removes large graphic files and Java Script code. Other embodiments may make other modifications or no modifications, depending on the nature and capabilities of the handheld client. In the described embodiment, the proxy server also modifies the page somewhat before sending the page to the handheld client.

V. Shared Portal

Figure 17:
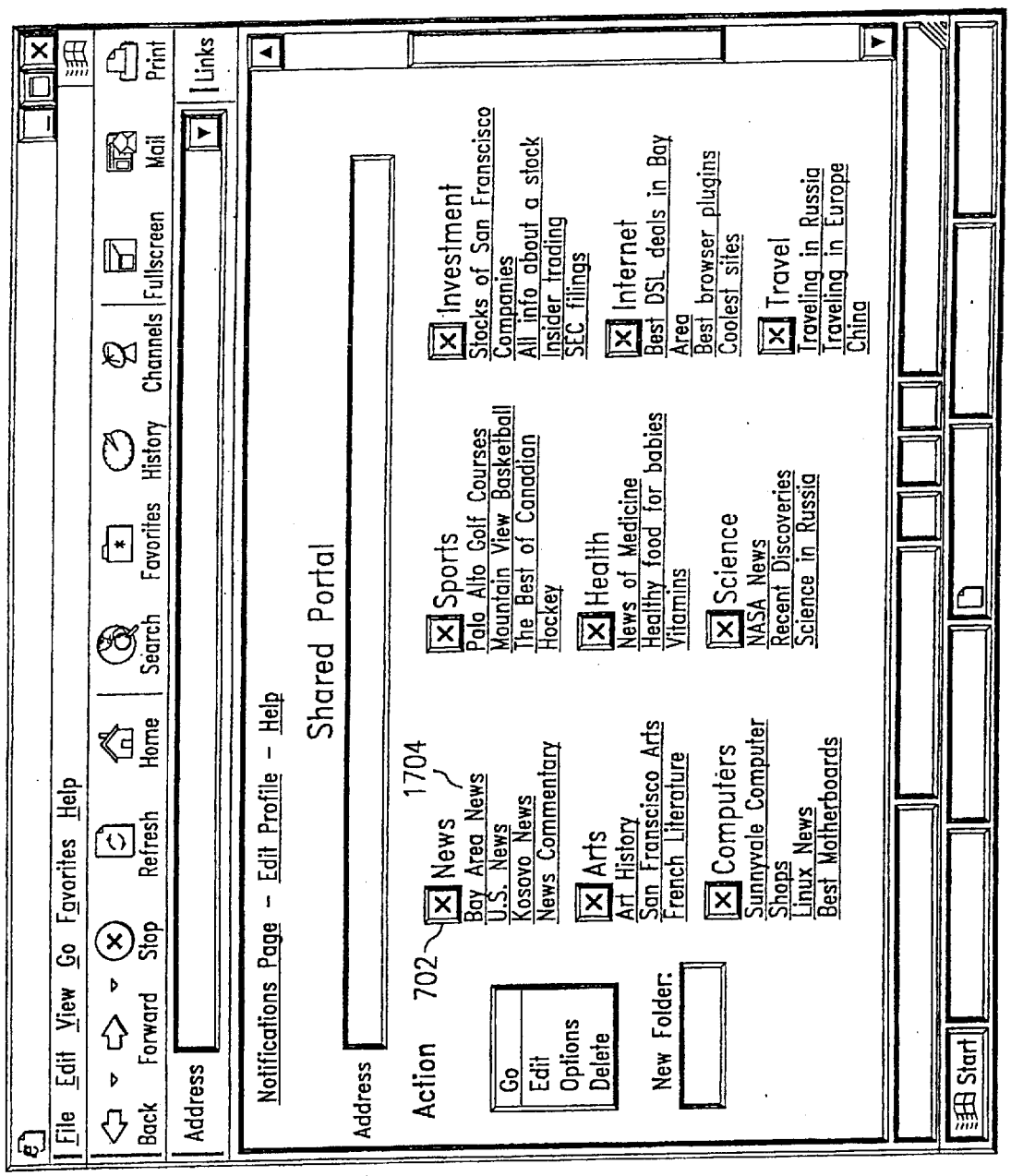
FIG. 17 is a display of a shared portal shortpage.

FIG. 17 is a display of a shared portal shortpage application. A shared portal is created by one or more persons and is viewable by multiple persons. Different users may have different access permissions stored within the server. For example, in one embodiment, a single user has permissions to create folders (such as folder 1702), but any user can add shortpages within folders (link 1704 is a link to a page titled "Bay Area News"). As another example, only a single user can add folders and links, but any user can access the shortpages. In a shared portal, whenever a user attempts to edit or create a shortpage, the server first checks the permissions of the user. The user may be required to enter a password and/or to Log on from an approved machine. Similarly, whenever a user attempts to access a shortpage, the server checks the permissions of the user to determine whether the user is authorized to access the page he has requested. A shared portals may be open to all users or may be restricted to certain groups, such as families, employees of a company, employees of a department, or clubs.

VI. Cluster Implementation

In one embodiment of the present invention, server 120 resides on a number of nodes, which are dual-Pentium Windows NT PCs. In this implementation, data is stored in a shared RAID file server. A hardware load-balancer, such as a Big/IP load balancer from FS Networks, Inc. of Seattle, Wash. is used to route user requests to the least busy node. Such an implementation uses persistent connections with, for example, a ten minute timeout to ensure that the requests from the same address get to the same server. When the first request for the given user comes to the given server, the user's data is read from the file server. If there is no activity for the time Q (for example, Q>T, 12 minutes), the data for the user is cleared from memory.

While the invention has been described in conjunction with a specific embodiment, it is evident that many alternatives, modifications and variations will be apparent to those skilled in the art in light of the foregoing description. For example, in one embodiment, shortpages are pre-created and offered to third persons who want specialized information or who want shorter web pages. Accordingly, it is intended to embrace all such alternatives, modifications and variations as fall within the spirit and scope of the appended claims and equivalents.

TABLE 1

```
WPCs - Web Procedure Call list
All WPCs take a username.
// The WPC consists of: (without "<" or ">")
//
/Username=<username>&ProcName=<procname>&arg1 =val1&arg2=
val2&...&argLast=valLast
// (The number of args is variable, and the "last" arg is optional).
// New user registration and user login.
NewUserLogin - Allows the user to enter registration information
RegisterUser - Submits username, full name, password, email, and other
info for a new user.
LoginUser - login user. Takes username and password
// Wizard Action
WizardAction - takes object (shortpage, notification, or combopage) id
    Edit      - start editing the object
    Props     - Displays properties of the object
    CreateShortpage - creates a shortpage
    CreateNotification - creates a notification
    CreateCombopage - creates a combopage
    Browse - browse to the given URL
    Go - go to the given shortpage/combopage
    Delete - delete given object
    Next - present logically the next screen in the wizard
    Done - done with the editing
    Cancel - cancel editing
B_GetPage - Get a page. Takes a URL
B_GetPageS - Same, but the request came through a script, URL needs
some massaging.
Takes a URL and a base URL for the page to be appended to it.
StartPage - show Start Page for the user
NotifPage - Show notification page for the user
U_DeleteNotifs - delete certain notification messages. Takes message ids.
P_SelectionFrame - Displays the selection frame (upper frame) for
the shortpage creation
P_DoCommand - do editing command, such as "Show" block,
or "Hide" block.
    Takes block id as a parameter, and command id ("Show", "Hide",
    "Notify", etc.)
ProfileMgrAction - Edit profile settings
```

TABLE 2

```
typedef CArray<CRepNode*, CRepNode*>CRepNodeArray;
class CRepNode
{
    friend class CRepBuilder;
public:
    CRepNode(CRepNode *pParent=NULL, int iIndex=0);
    virtual~CRepNode();
    void AddChild(CRepNode *pChild);
    void InsertChild(CRepNode *pChild, int iIndex);
    void Serialize(CMyArchive& ar);
    enum Type{
        NONE,
        TEXT,
        SIMPLE_TAG,
        CONTAINER_TAG,
        COMMENT,
        BADTAG, // bad closing tag.
        SCRIPT, // script node contains both <SCRIPT> and
        </SCRIPT>
        WHITESPACE,// whatever "trims" to an empty string.
        BAD_CLOSING
    };
    Type m_Type;
#define FLG_BLOCK_BEGIN 0x1
#define FLG_BLOCK_END 0x2
#define FLG_BLOCK_MASK (FLG_BLOCK_BEGIN |
FLG_BLOCK_END)
#define FLG_HIDE            0x10 // hide this node.
#define FLG_CHANGED         0x20 // node has changed
#define FLG_NOMATCH         0x40 // couldn't match this node.
#define FLG_SHOW            0x80 // show the node and subnodes.
#define FLG_NOTIFY          0x100 // Notify on this node.
#define FLG_BADLY_CLOSED 0x200 // This node is incorrectly
                                      nested.
```

TABLE 2-continued

```
#define FLG_TEMP         0xf000 // The mask for temp bits
                                used by stuff
                                // here and there for a short
                                time.
    ULONG m_Flags;
    CNodeInfo *m_pInfo; // any data can be stored here.
                        // not saved to the disk!
    CNotifyInfo *m_pNotify; // Notification info on this node.
                            // must be serialized.
    // has either the text, or a simple tag or
    // the full tag with params, but without nested tags.. Example:
    //"<TD WIDTH=117 VALIGN=TOP ALIGN=LEFT>"
    CString m_Text;
    // Children of a complex tag.
    CRepNodeArray m_aKids;
    // the following two fields are redundant for all known (to our
    // program) tags.
    TAG m_Tag;
    // The tag without params and <or>, like "TD"
    // Note that there is never a closing tag, like </TD> in the
    // representation.
    // If the type of the node is CONTAINER_TAG, then it is
    // assumed that there is a closing tag after all m_aKids.
    CString m_TagName;
    CString m_NodeHeader;
    CRepNode *GetParent() {return m_pParent; }
    int GetIndex() { return m_Index; }
    CRepNode *m_pParent; // root object has this NULL
    int m_Index; // index into the array of the parent node.
#if DEBUG
    void AssertValid(); // CObject-like validation function.
#endif
};
```

What is claimed is:

1. A method for creating a short web page based on an original web page, comprising:

retrieving a current version of the original web page;

dividing the current version of the web page into a plurality of blocks;

adding user-selection information to each of the plurality of blocks, the user-selection information including a select and a non-select user option;

allowing a user to select ones of the plurality of blocks by exercising a select user option from the user-selection information associated with each of the plurality of blocks;

allowing a user to non-select others of the plurality of blocks by exercising a non-select user option from the user-selection information associated with each of the plurality of blocks;

storing only the user selected ones of the plurality of blocks; and creating a short web page based only on the stored ones of the plurality of blocks.

2. The method of claim 1 and further including displaying the short page on a client system.

3. The method of claim 2 wherein the client system includes a personal computer.

4. The method of claim 2 wherein the client system includes a personal digital assistant device.

5. The method of claim 2 wherein the client system includes a web-enabled telephone including a display.

6. The method of claim 2 wherein the client system includes an alpha-numeric paging device.

7. The method of claim 2 wherein the client system includes a web-enable device.

8. The method of claim 2 the client system includes a device using a WAP protocol.

9. The method of claim 1 wherein the original web page is retrieved from a worldwide web page.

10. The method of claim 1 wherein the original web page is specified in a hypertext markup language.

11. An apparatus for creating a short web page based on an original web page, comprising:

a software portion configured to retrieve a current version of the original web page;

a software portion configured to divide the current web page into a plurality of blocks;

a software portion configured to add user-selection information to each of the plurality of blocks, the user-selection information including a select and a non-select user option;

a software portion configured to allow a user to select ones of the plurality of blocks by exercising a select user option from the user-selection information associated with each of the plurality of blocks;

a software portion configured to allow a user to non-select others of the plurality of blocks by exercising a non-select user option from the user-selection information associated with each of the plurality of blocks;

a software portion configured to store only the user selected ones of the plurality of blocks; and a software portion configured to create a short web page based only on the stored ones of the plurality of blocks.

12. The apparatus of claim 11 wherein the software portions are stored in a web-enabled device.

13. The apparatus of claim 11 and further including a software portion configured to receive the short web page via a WAP protocol.

* * * * *